(12) United States Patent
Wessel et al.

(10) Patent No.: US 9,630,284 B2
(45) Date of Patent: Apr. 25, 2017

(54) CONFIGURABLE WELDING TABLE AND FORCE INDICATING CLAMP

(71) Applicant: WOLF ROBOTICS, LLC, Fort Collins, CO (US)

(72) Inventors: Brent Wessel, Fort Collins, CO (US); Todd Scarpella, Fort Collins, CO (US); Lance F. Guymon, Fort Collins, CO (US)

(73) Assignee: Lincoln Global, Inc., Cleveland, OH (US)

( * ) Notice: Subject to any disclaimer, the term of this patent is extended or adjusted under 35 U.S.C. 154(b) by 584 days.

(21) Appl. No.: 13/941,270

(22) Filed: Jul. 12, 2013

(65) Prior Publication Data
US 2014/0015186 A1    Jan. 16, 2014

Related U.S. Application Data

(60) Provisional application No. 61/671,032, filed on Jul. 12, 2012.

(51) Int. Cl.
*B23Q 1/03* (2006.01)
*B23K 37/04* (2006.01)
(Continued)

(52) U.S. Cl.
CPC .......... *B23Q 1/037* (2013.01); *B23K 37/0435* (2013.01); *B23K 37/0461* (2013.01);
(Continued)

(58) Field of Classification Search
CPC .... H02G 3/125; B23Q 1/037; B23K 37/0461; B23K 37/0435; B25B 5/106; B25B 5/105;
(Continued)

(56) References Cited

U.S. PATENT DOCUMENTS 2,604,739 A * 7/1952 Evans ..................... B24B 41/06
269/254 CS
2,780,871 A * 2/1957 Campbell ............ G01B 5/0032
33/611

(Continued)

OTHER PUBLICATIONS

Childs, Peter R.N.. (2004). Mechanical Design (2nd Edition)—11.6 Belleville Spring Washers. Elsevier. Online version available at: http://app.knovel.com/hotlink/pdf/id:kt00BIDK33/mechanical-design-2nd/belleville-spring-washers.*

(Continued)

*Primary Examiner* — Larry E Waggle, Jr.
*Assistant Examiner* — Mahdi H Nejad
(74) *Attorney, Agent, or Firm* — William W. Cochran; Cochran Freud & Young LLC

(57) ABSTRACT

Disclosed is a configurable table that uses configurable mounting pieces to mount a work piece on the configurable table at a predetermined location. The configurable table includes a fixed portion of a mounting clamp that can engage a rotatable portion of a mounting clamp on a positioner or other device. The positioner can then rotate the configurable table and work piece to various orientations for performing horizontal welds, using robotic welders, as well as machining and cutting. The configurable table can also be used for initial fabrication, cutting, or working, which eliminates the need for separate fabrication and finish welding tables.

3 Claims, 21 Drawing Sheets

(51) Int. Cl.
*B25B 5/06* (2006.01)
*B25B 5/00* (2006.01)
*B23Q 17/00* (2006.01)

(52) U.S. Cl.
CPC ............ *B23Q 17/005* (2013.01); *B25B 5/006* (2013.01); *B25B 5/062* (2013.01); *Y10T 29/49998* (2015.01); *Y10T 29/53961* (2015.01)

(58) Field of Classification Search
CPC ... B25B 5/062; B25B 5/006; Y10T 29/49998; Y10T 29/53961
USPC ........ 269/258, 189, 37, 311, 218, 224, 48.4, 269/160, 254 CS, 254 R, 166–169, 269/91–101, 177, 216, 0.93, 175, 246, 269/25 CS, 55, 263, 275, 285, 267, 264, 269/281, 87.2, 170, 157, 70, 241; 29/559
See application file for complete search history.

(56) References Cited

U.S. PATENT DOCUMENTS

| | | | | |
|---|---|---|---|---|
| 2,819,534 A * | 1/1958 | Kitzman | ............. | G01B 5/0032 33/502 |
| 2,835,044 A * | 5/1958 | Haunert | .................... | F01L 1/20 33/611 |
| 2,855,692 A * | 10/1958 | Campbell | ............. | F02M 19/00 33/542 |
| 3,127,162 A * | 3/1964 | Miller | .................... | H01H 49/00 269/157 |
| 3,198,509 A * | 8/1965 | Sunderlage | ............... | B25B 5/06 269/20 |
| 3,712,606 A * | 1/1973 | Cole | ........................ | B25B 5/106 269/239 |
| 3,967,817 A * | 7/1976 | McClocklin | ............ | B25B 5/064 269/32 |
| 4,372,156 A * | 2/1983 | Meismer | .................. | G01B 5/14 123/41.84 |
| 4,503,619 A * | 3/1985 | Nelsen | ..................... | G01B 3/22 33/607 |
| 4,526,354 A * | 7/1985 | Mannes | .................. | B25B 5/104 269/93 |
| 4,804,433 A * | 2/1989 | Smith | ........................ | C09J 5/06 156/359 |
| 5,192,062 A * | 3/1993 | Berchtold | ................. | B25B 1/24 269/228 |
| 5,316,202 A * | 5/1994 | Murray | ................ | B23K 20/023 228/44.3 |
| 5,901,426 A * | 5/1999 | Okazaki | ............ | B23K 37/0443 269/329 |
| 6,158,728 A * | 12/2000 | Smith | ..................... | B25B 5/006 269/88 |
| 6,564,467 B1 * | 5/2003 | Kay | ........................ | B61K 9/12 246/169 R |
| 8,292,280 B2 * | 10/2012 | Yokota | ..................... | B23Q 3/06 269/254 CS |
| 8,341,823 B1 * | 1/2013 | MacIejewski | ......... | G02B 23/22 269/254 CS |
| 8,523,155 B2 * | 9/2013 | Kuroda | ................... | F16L 39/04 137/614 |
| 2003/0193122 A1* | 10/2003 | Nishimura | .............. | B25B 5/106 269/99 |
| 2010/0262275 A1* | 10/2010 | Schoening | ........... | B23K 20/023 700/213 |
| 2013/0276543 A1* | 10/2013 | Epureanu | ................ | G01M 7/02 73/663 |
| 2015/0075410 A1* | 3/2015 | Wong | ..................... | B23K 26/38 108/28 |

OTHER PUBLICATIONS

Wolf Robotics, LLC. Catalogue (Smartdock), 2013.*
Tapered-Nose Clamp Straps; CarrLane Manufacturing Co.*
Clamp Straps with adjustable unit; Model K0004; www.kipp.com.*
Smartcock (Wolf Robotics Flexible Tooling Solutions), 2013.*
Clamp straps with adjustment unit, Model K0004, Heinrich Werk KG.*

* cited by examiner

CONFIGURABLE WELDING TABLE AND FORCE INDICATING CLAMP

CROSS-REFERENCE TO RELATED APPLICATION

This application is based upon and claims priority to U.S. provisional application Ser. No. 61/671,032, filed Jul. 12, 2012, entitled "Configurable Welding Table and Force Indicating Clamp," which application is specifically incorporated herein by reference for all that it discloses and teaches.

BACKGROUND

Automated welding techniques using robotic welders and large positioners have greatly increased the quality of industrial welding. Greater reliability can be provided using automated welding techniques. In addition, the welds can be completed rapidly, without the use of highly paid and highly skilled welders.

In addition, the use of positioners to position a piece for welding has also provided for high quality welds. Welds that are performed when the piece is disposed in a horizontal position allow the weld to properly flow into an opening and properly fill the space in the opening. Large positioners are capable of rotating large pieces into positions, so that horizontal, high quality welds can be performed.

SUMMARY OF THE INVENTION

An embodiment of the present invention may therefore comprise a method of configuring a work piece for performing a work task comprising: providing a configurable table having a plurality of mounting locations disposed on a first portion of the configurable table and a first portion of a rotatable mounting clamp disposed on a second portion of the configurable table; providing a plurality of configurable mounting pieces having mounting connectors for mounting the mounting pieces at the mounting locations disposed on the first surface of the configurable table, the configurable mounting pieces adapted to position and mount the work piece in a predetermined location on the configurable table; providing a second portion of the rotatable mounting clamp that is designed to engage the first portion of the rotatable mounting clamp with sufficient force so that the configurable table can be rotated with the work piece mounted on the configurable table in the predetermined position with sufficient force so that the work piece does not substantially move with respect to the configurable table.

An embodiment of the present invention may further comprise a system for configuring a work piece for a work task comprising: a configurable table having a plurality of mounting locations disposed on a first portion of the configurable table; a first portion of a rotatable mounting clamp disposed on a second portion of the configurable table; a plurality of configurable mounting pieces that position and securely mount the work piece to the first portion of the configurable table; a plurality of mounting connectors that engage the mounting locations disposed on the first portion of the configurable table to securely mount the configurable mounting pieces to the first portion of the configurable table; a second portion of the rotatable mounting clamp that engages the rotatable mounting clamp that is configured to engage the first portion of the rotatable mounting clamp with sufficient force to rotate and invert the work piece.

An embodiment of the present invention may further comprise a mounting device for mounting a work piece to a configurable table comprising: a base plate that is adapted to secure the mounting device in a desired location on the configurable table; a clamping lever that is configured to engage and apply a tightening device that engages the base plate and the clamping lever that creates a force on the clamping lever to hold the work piece; an integral deflection gauge that is engaged by the clamping lever that measures compression of a spring to provide a measure of the force applied to the work piece.

An embodiment of the present invention may further comprise a clamp for securing a work piece to a configurable table comprising: a base that secures the clamp to the configurable table at a desired location on the configurable table; a shaft mounted to the base; a clamping lever that has a clamping portion for clamping the work piece to the configurable table, a deflection portion and an opening that engages the shaft so that the clamping lever can rotate on the shaft to a first position so that the clamping lever does not interfere with the work piece during mounting of the work piece on the configurable table, and to a second position so that the clamping portion engages the work piece; a spring that compresses in response to a force applied from the shaft that is transferred to the clamping lever and to the work piece; a deflection gauge disposed in the clamp to measure compression of the spring to provide a measure of the force that is transferred to the work piece.

An embodiment of the present invention may further comprise a crowder for mounting and positioning a work piece to a configurable table comprising: a base plate that secures the crowder to the configurable table; a crowder body housing; a threaded shaft block disposed in the crowder body so that the shaft block can move laterally in the crowder body; a threaded shaft that rotatably engages the shaft block and applies a force on the work piece in response to rotation of the shaft which causes threaded shaft block to translate laterally; a spring that compresses in response to lateral translation of the threaded shaft block; a deflection gauge that measures the lateral translation of the shaft block to provide a measurement of the force applied to the work piece.

An embodiment of the present invention may further comprise a system for configuring a work piece for a work task comprising: a configurable table having a plurality of mounting locations disposed on a first portion of the configurable table; at least one mounting clamp for mounting the configurable table to a position; a plurality of configurable mounting pieces that position and securely mount the work piece to the first portion of the configurable table with sufficient force to hold the work piece to the configurable table without substantial movement when the work piece is rotated; a plurality of mounting connectors that engage the mounting locations disposed on the first portion of the configurable table to securely mount the configurable mounting pieces to the first portion of the configurable table.

An embodiment of the present invention may further comprise a mounting device for mounting a work piece to a table comprising: a base plate that secures the mounting device in a desired location on the table; a clamp that applies a force on the work piece and secures the work piece to the base plate; an integral force detector that provides an indication of the force generated by the clamp; an integral gauge that displays the force generated by the gauge.

DETAILED DESCRIPTION OF THE EMBODIMENTS

Figure 1:
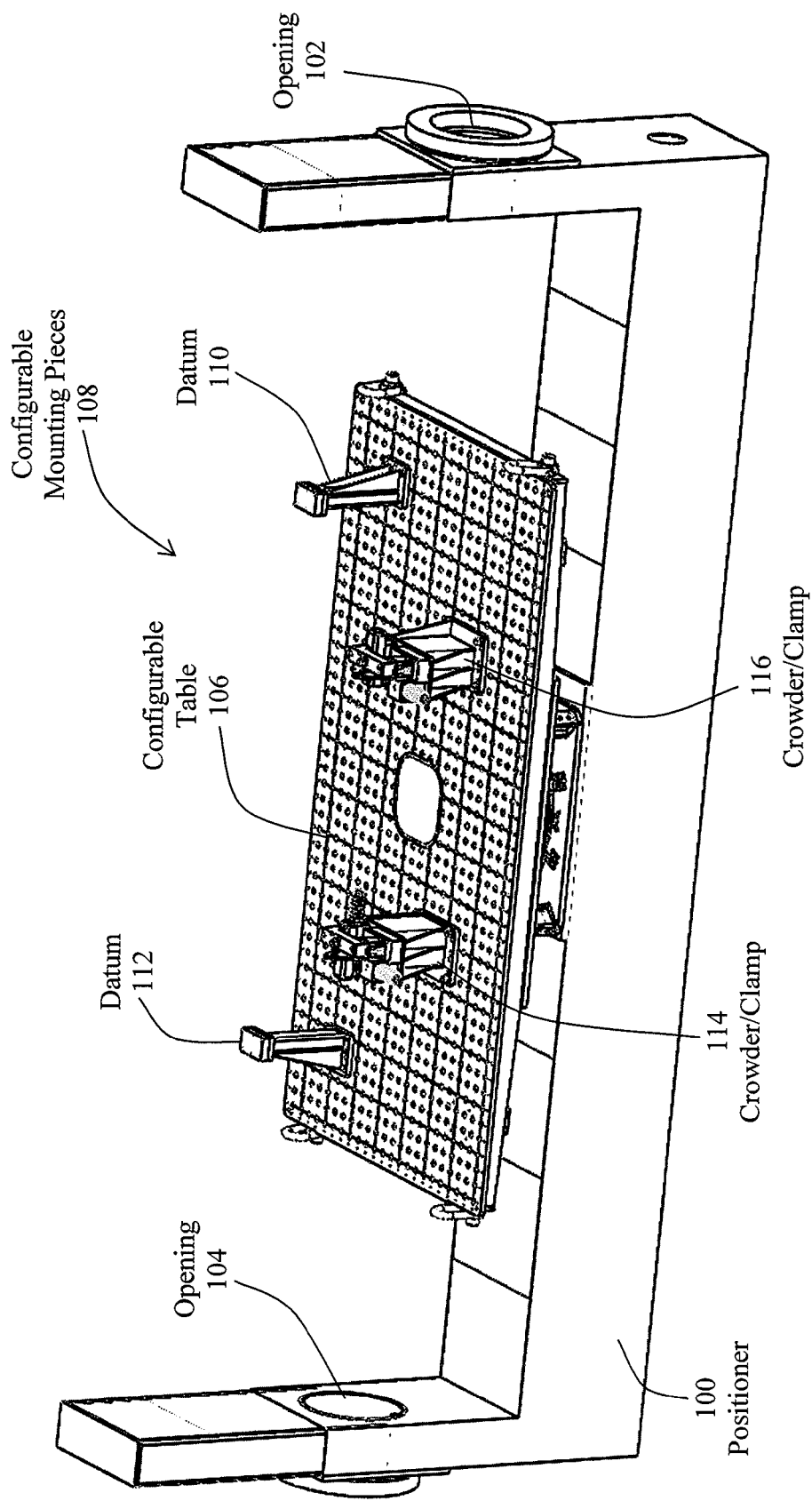
FIG. 1 is a schematic isometric view of an embodiment of a configurable welding table attached to a positioner.

FIG. 1 is an embodiment of a configurable table 106 mounted on a positioner 100. The configurable table 106 can be used for mounting work pieces for welding, machining, and other functions, known to those skilled in the art of manufacturing large devices. The configurable table 106 can be configured with a plurality of configurable mounting pieces 108 that securely fasten a work piece (not shown) for welding or other functions. For example, the configurable table 106 can be used to clamp pieces for initial fabrication, as well as final fabrication. Positioner 100 can rotate the work piece, that is mounted on the configurable table 106, to various positions by rotation on an axis through openings 102, 104. Welding can be performed by robotic welders that extend into areas of the work piece (not shown) for performing either finished welds, or initial assembly welds.

It has been found by those skilled in the art that welds performed on substantially horizontal surfaces allow the weld material to flow evenly within the weld opening to form a consistent and uniform weld between two or more pieces of metal. Positioner 100, illustrated in FIG. 1, can rotate the work piece (not shown) mounted on the configurable table 106 to various positions, so that the robotic welders can perform welds on the work piece when the weld is substantially horizontal. In this manner, the use of the configurable table 106 and the positioner 100 allows consistent and uniform welds to be performed by automated welding robots.

The configurable mounting pieces 108, illustrated in FIG. 1, are securely connected to the configurable table 106. By way of example only, one inch threaded bolts can be used to bolt the configurable mounting pieces 108 to the configurable table 106, so that various work pieces can be clamped to the configurable table, so that there is substantially no movement of the work pieces as the positioner is moved. In that regard, the configurable mounting pieces 108 can be located to attach various types, sizes and shapes of work pieces to the configurable table 106, so that the center of gravity of the work piece is centered on the positioner 100. This allows the positioner 100 to operate in an efficient manner. Of course, the work piece can be mounted on any position on the table, if desired. However, mounting of the work piece at the center of gravity allows the work piece to be rotated with less force.

Figure 2:
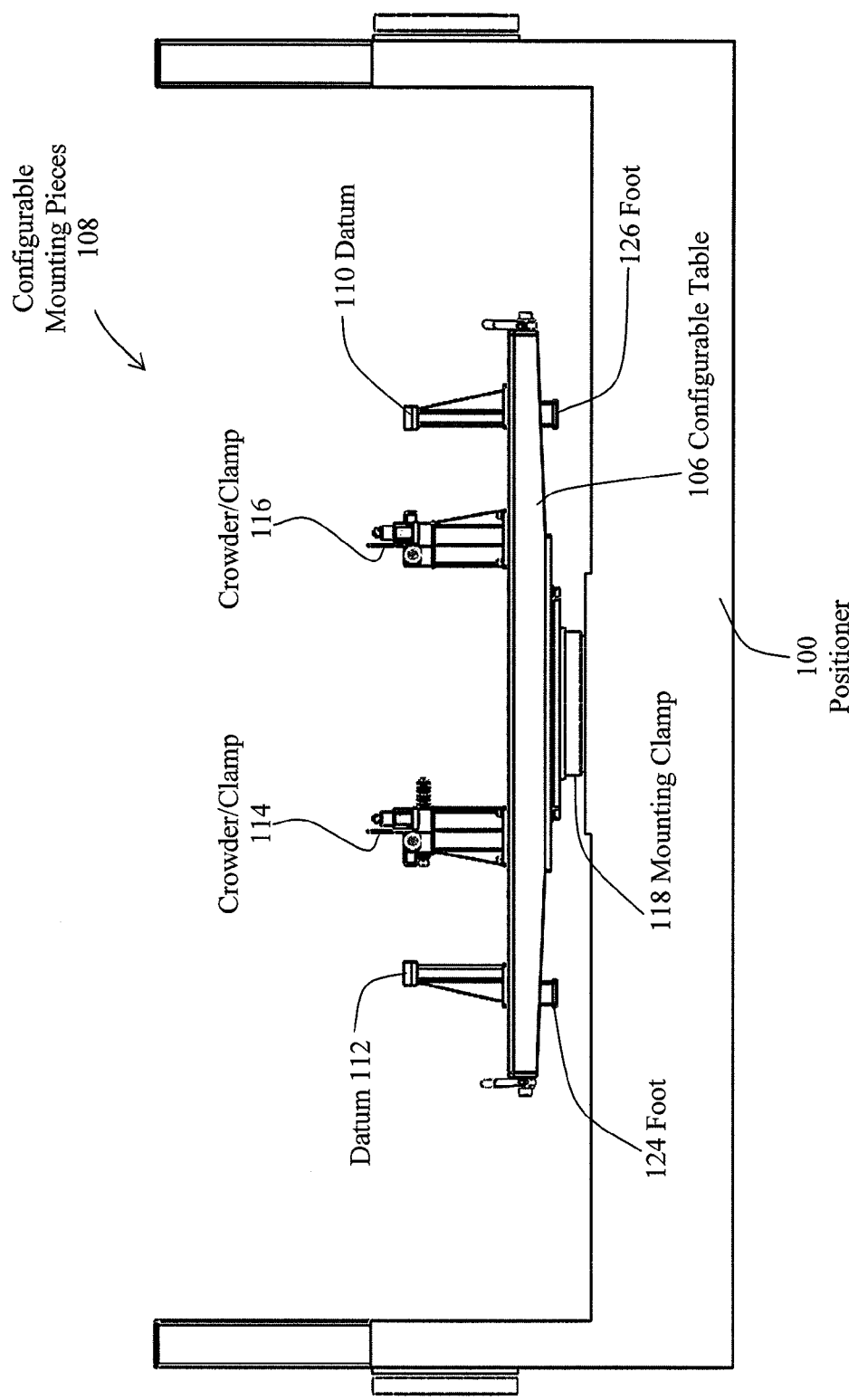
FIG. 2 is a side view of the configurable welding table of FIG. 1 mounted on a positioner.
Figure 20:
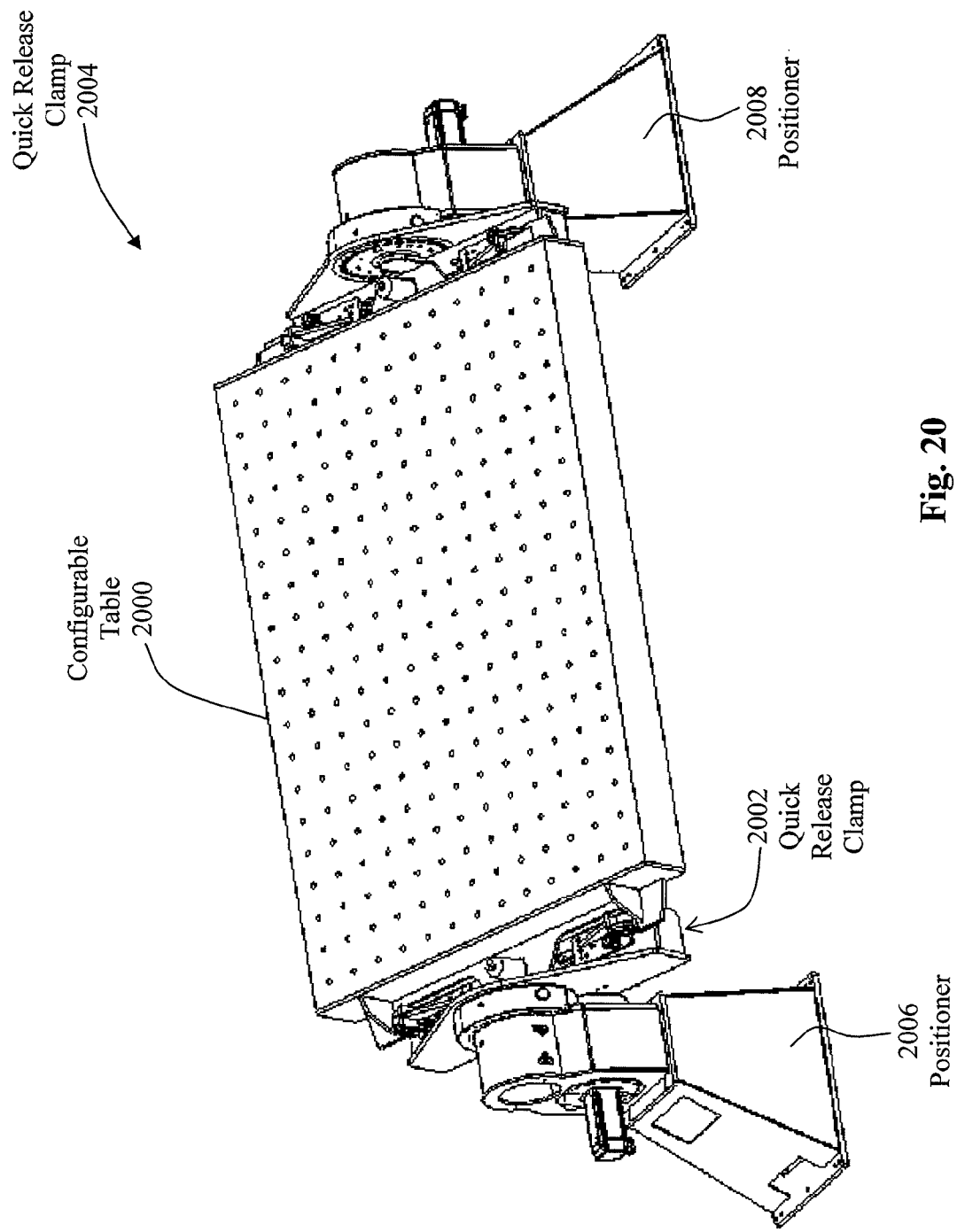
FIG. 20 is an isometric view of an embodiment of a configurable table that is rotated on a single axis by two positioners.

FIG. 2 is a schematic side view of the positioner 100 and configurable table 106 of the embodiment of FIG. 1. As shown in FIG. 2, the configurable mounting pieces 108 comprise various devices for mounting and clamping the work piece (not shown) to the configurable table 106. For example, the configurable mounting pieces 106 comprise a datum 112, a combined crowder and clamp 114, another combined crowder and clamp 116, and an additional datum 110. The datums 110, 112 provide location points for accurately mounting the work piece to the configurable table 106. The combined crowder and clamps 114, 116 crowd the work piece to a datum and clamp the work piece to the configurable table 106. Mounting clamp 118 functions to releasably attach the configurable table 106 to the positioner 100. Any type of mounting clamp can be used and can attach the configurable table 106 to positioner 100 at a centered location, as shown in FIG. 2, or at any location, including the ends of the configurable table 106, as shown in FIG. 20. Mounting clamps can include quick release mounting clamps, such as disclosed in, but not limited to, the clamp disclosed in U.S. Patent Ser. No. 61/535,402, filed Sep. 16, 2011, by John Schoening, (now U.S. Pat. No. 9,095,957 issued Aug. 4, 2015) entitled "Rotary Actuated Axial Clamp," which is specifically incorporated herein by reference for all that it discloses and teaches.

The configurable table 106, illustrated in FIG. 2, can be configured with the proper configuring mounting pieces 108 and the work piece prior to mounting the configurable table 106 to the positioner 100. In this manner, the configurable table 106 can be placed on a floor and supported by the feet 124, 126 that are disposed on the bottom portion of the configurable table 106. As indicated herein, initial fabrication of a work piece (not shown) can occur prior to mounting the configurable table 106 on the positioner 100. This allows the configurable table 106 to function both as an initial fabrication table, as well as a final fabrication table, so as to create a more efficient process for fabricating work pieces and reducing the work flow process, leading to faster and better fabrication.

Figure 3:
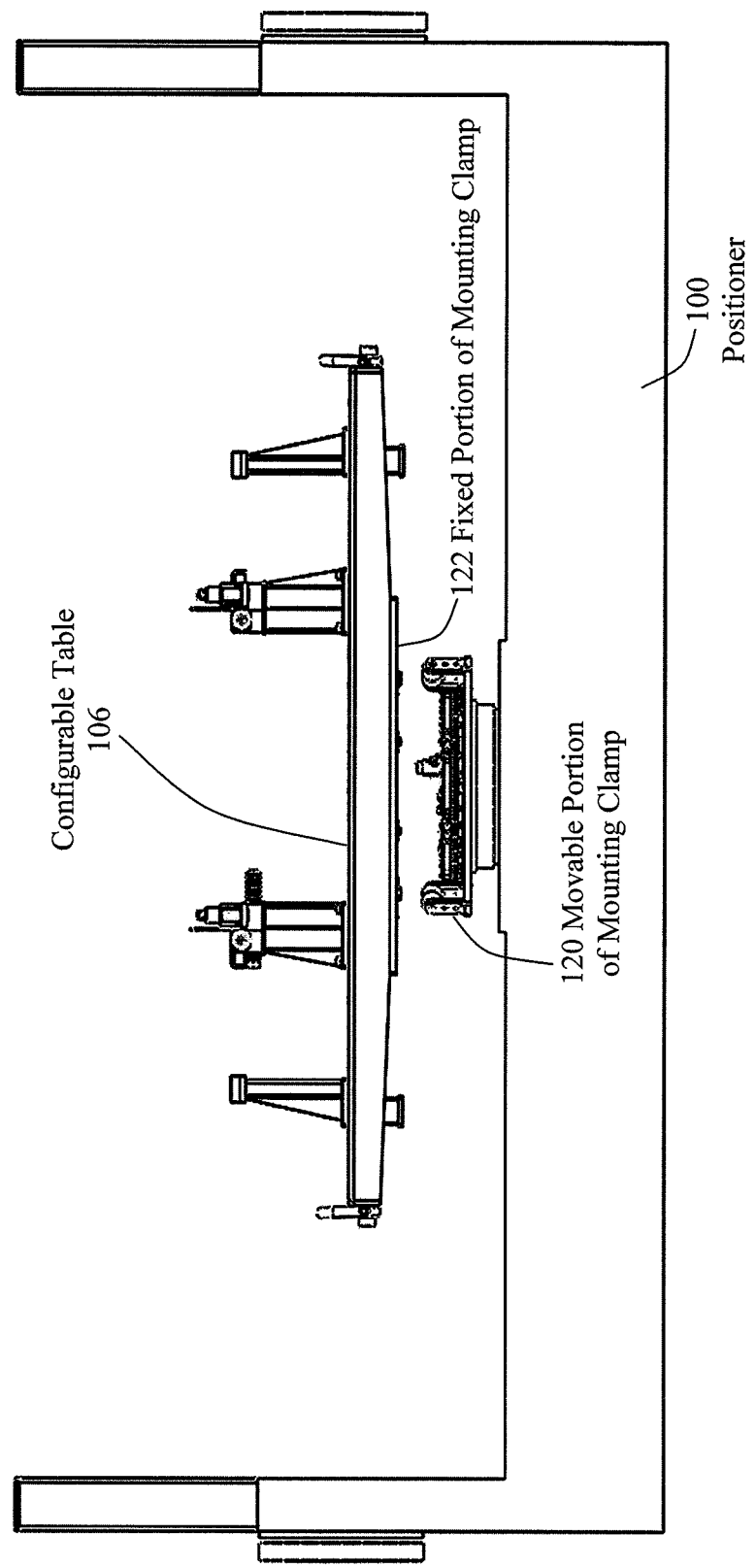
FIG. 3 is a side view of the configurable welding table of FIG. 1 that is disconnected from a positioner.

FIG. 3 is another side view of the embodiment of FIG. 2, illustrating the configurable work table 106 disconnected from the positioner 100. As illustrated in FIG. 3, the fixed portion 122 of the mounting clamp 118 is disposed on the configurable table 106. The fixed portion 122 is less expensive than the moveable portion 120 of the mounting clamp 118 that is located on the positioner 100. As such, costs are reduced, since multiple different configurable tables, such as configurable table 106, can be constructed and mounted to the moveable portion 120 of mounting clamp 118 on the positioner 100. Accordingly, multiple work tables can be configured with work pieces while a work piece is being welded, so as to reduce fabrication time, and increase overall efficiency of the system. As mentioned above, any type of mounting clamp can be used to clamp configurable table 106 to positioner 100, including quick release mounting clamps, or non-quick release clamps. Quick release mounting clamps have the advantage of speeding the overall work flow process.

Figure 4:
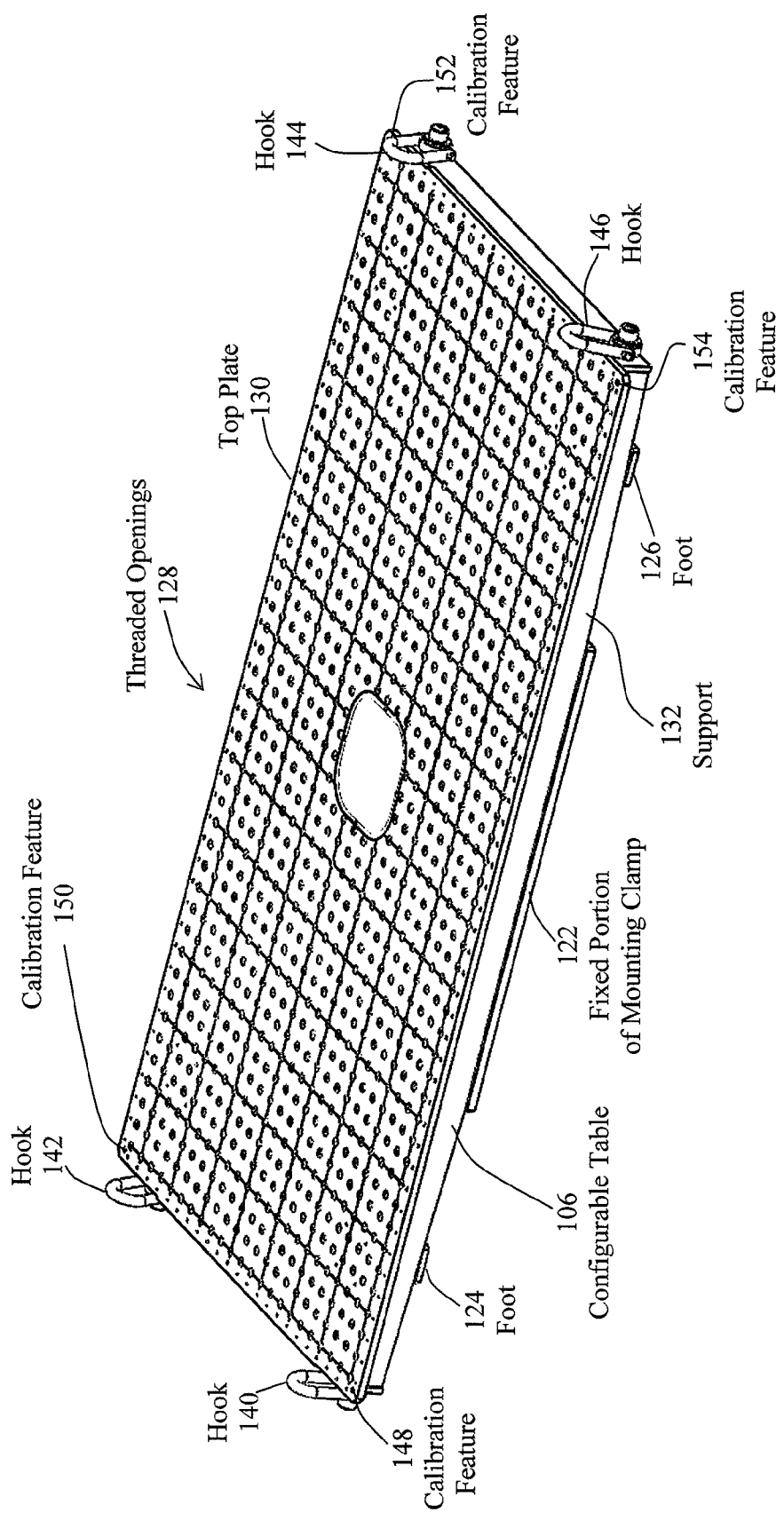
FIG. 4 is an isometric view of the top portion of the configurable welding table of FIG. 1.

FIG. 4 is a schematic isometric top view of an embodiment of a configurable table 106. As illustrated in FIG. 4, the configurable table 106 has a top plate 130 that may be fabricated from steel or other similar material. A plurality of threaded openings 128 are formed in the top plate 130. By way of example only, the threaded openings may be threaded openings that accept a one inch threaded bolt. Of course, any type of attachment can be used to attach configurable mounting pieces 108 to configurable table 106, including non-threaded openings that provide a way of mounting the configurable table 106 with a sufficient force so that the configurable mounting pieces do not move when positioner 100 rotates a work piece. The threaded openings 128, or other openings, are disposed in a predetermined pattern, such as the matrix of rows and columns illustrated in FIG. 4. Of course, any desired pattern of threaded openings can be formed in the top plate 130. In that regard, the pattern of threaded openings 128 can be labeled, so that the position of the configurable mounting pieces 108 can be identified and mounted on the top plate 130 at the proper location for each work piece. The top plate 130 is attached to a plurality of supports, such as support 132. FIG. 4 also illustrates foot 124 and foot 126 that support the configurable table 106 when the configurable table 106 is placed on a surface. Fixed portion 122 of the mounting clamp 118 is also illustrated in FIG. 4. The fixed portion 122 forms a fixed piece mounted to the configurable table 106, that is adapted to fit with the moveable portion 120 of the mounting clamp 118. Hooks 140, 142, 144 and 146 are used to lift the configurable table 106 and position the configurable table 106 for attachment to the positioner 100 or other device, using the mounting clamp 118. Calibration features 148, 150, 152, 154 are located in the corners of the top plate 130. The calibration features 148-154 allow the robotic welder to position itself with respect to the configurable table 106, so that the robotic welder can be accurately located with respect to the work piece. The calibration features 148-154 can comprise any desired type of calibration feature, including holes, studs or simply a marking on the top plate 130.

Figure 5:
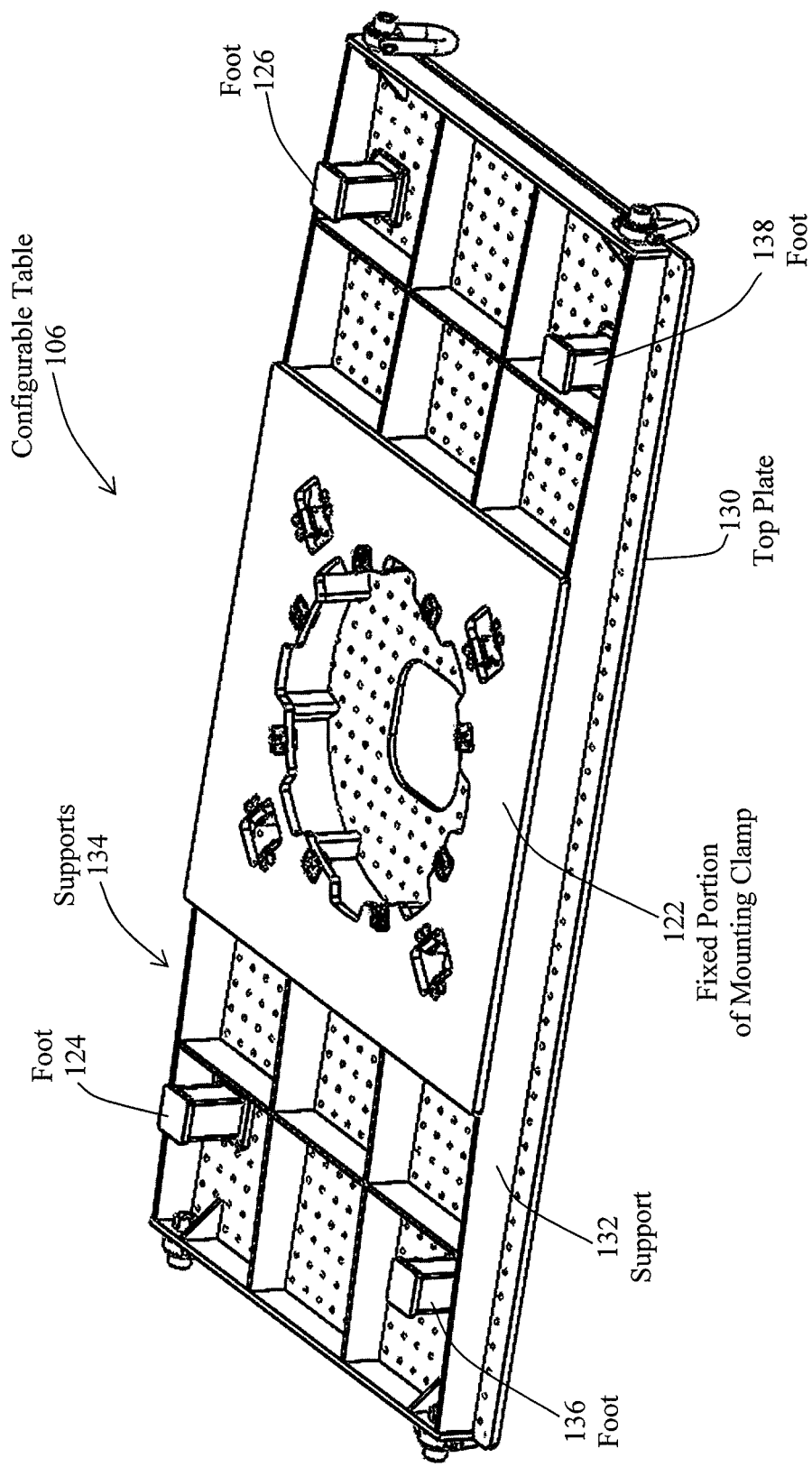
FIG. 5 is an isometric bottom view of the configurable welding table of FIG. 1.

FIG. 5 is an isometric bottom view of the configurable table 106. As illustrated in FIG. 5, there are four feet connected to the bottom portion of the configurable table 106, i.e., foot 124, foot 126, foot 136, foot 138. Feet 124, 126, 136, 138 extend beyond the fixed portion 122 of the mounting clamp 118, so that when the configurable table 106 is placed on feet 124, 126, 136, 138, there is clearance between the fixed portion 122 and the surface, so that no damage occurs to fixed portion 122. As illustrated in FIG. 5, the fixed portion 122 is securely attached to the supports 134 of the configurable table 106. The fixed portion 122 is centrally mounted on the bottom portion of the configurable table 106, so that the center of gravity of the configurable table 106 is centrally disposed on the moveable portion 120 of the mounting clamp 118. The central mounting of the fixed portion 122 of clamp 118, on the bottom portion of the configurable table 106, also allows work pieces to be centered on the configurable table 106, while maintaining the center of gravity of the work piece at a central location on the configurable table 106. Again, the fixed portion 122 can be disposed at any location on configurable table 106. Supports 134 are formed in a pattern and are securely attached to the bottom of the top plate 130, in any desired manner, such as by welding. The supports are formed in a pattern and welded together, so that the supports do not interfere with the threaded holes in the top plate 130. The fixed portion 122 provides the tabs that allow the rotatable portion 120 to rotate and clamp the fixed portion 122 in the manner described in U.S. Patent Application Ser. No. 61/535,402, filed Sep. 16, 2011, by John Schoening (now U.S. Pat. No. 9,095,957 issued Aug. 4, 2015), entitled Rotary Actuated Axial Clamp, which is specifically incorporated herein by reference for all that it discloses and teaches.

Figure 6:
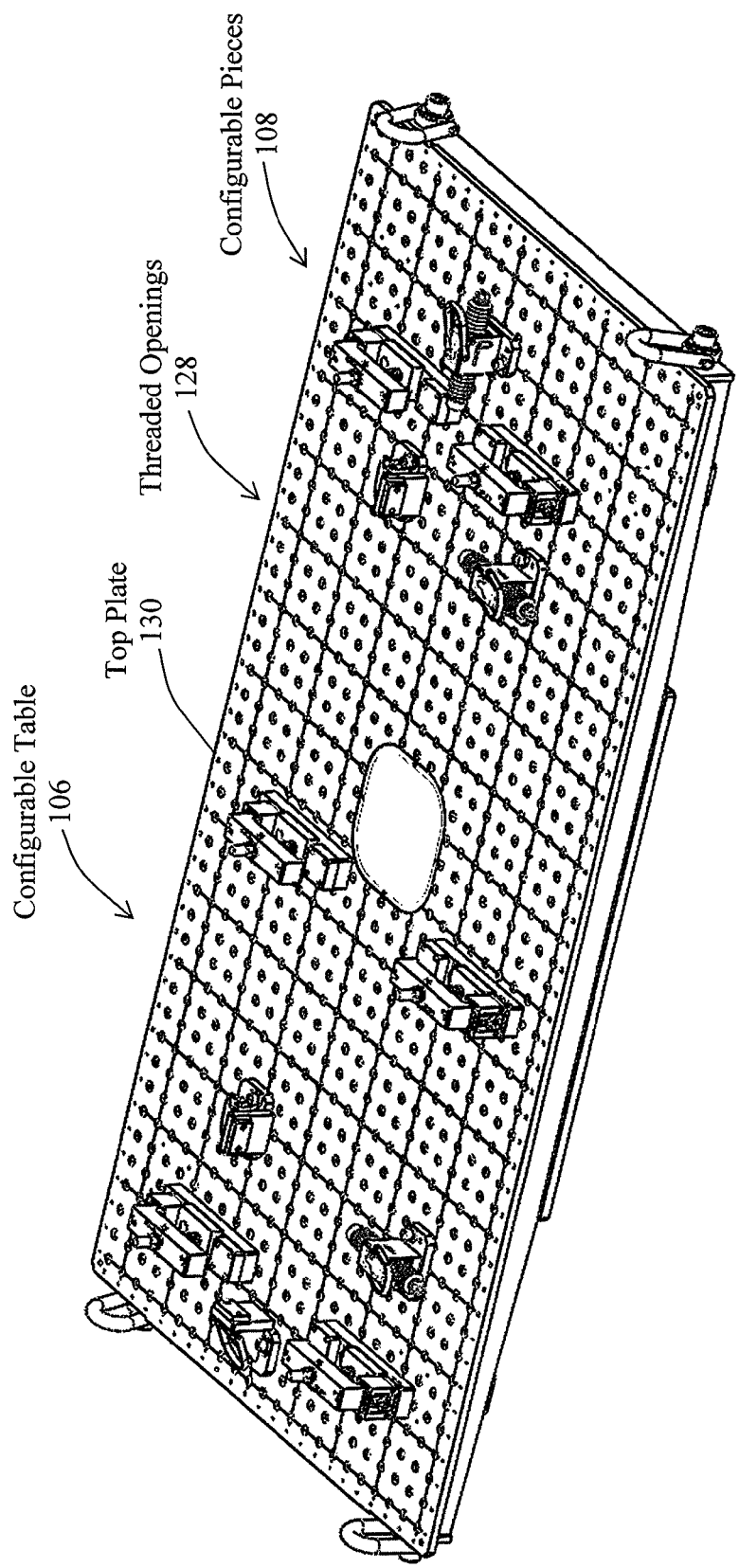
FIG. 6 is a top perspective view of the configurable welding table of FIG. 1 with a plurality of configurable mounting pieces located on the configurable welding table.

FIG. 6 is a schematic isometric view illustrating the configurable table 106 with a plurality of configurable pieces 108 attached to the top surface of top plate 130. As shown in FIG. 6, the configurable pieces 108 are disposed in various locations on top plate 130 and are attached to the top plate 130 with threaded bolts, or other attachment devices, that engage the threaded openings 128, or other types of openings. Of course, other ways of attaching the configurable pieces 108 to the top plate 130 can be used, as well known by those skilled in the art. The configurable pieces 108 are located at positions on the top plate 130 to clamp the work piece in the desired location on the configurable table 106 for welding, cutting or other functions. Various types of configurable pieces 108 can be used to accurately locate the work piece on the top plate 130 of the configurable table 106, so that robotic devices (not shown) can accurately perform the work task, whether that work task is welding, cutting, or other work task. The various mounting locations, which are shown as the threaded openings 128, provide a large amount of variability and flexibility in mounting the work piece on the configurable table 106. In general, however, it is desirable to mount the work pieces so that the center of gravity of the work piece is centrally located on configurable table 106, as close as possible, to reduce the forces required to turn and rotate the work piece and minimize forces on positioner 100.

Figure 7:
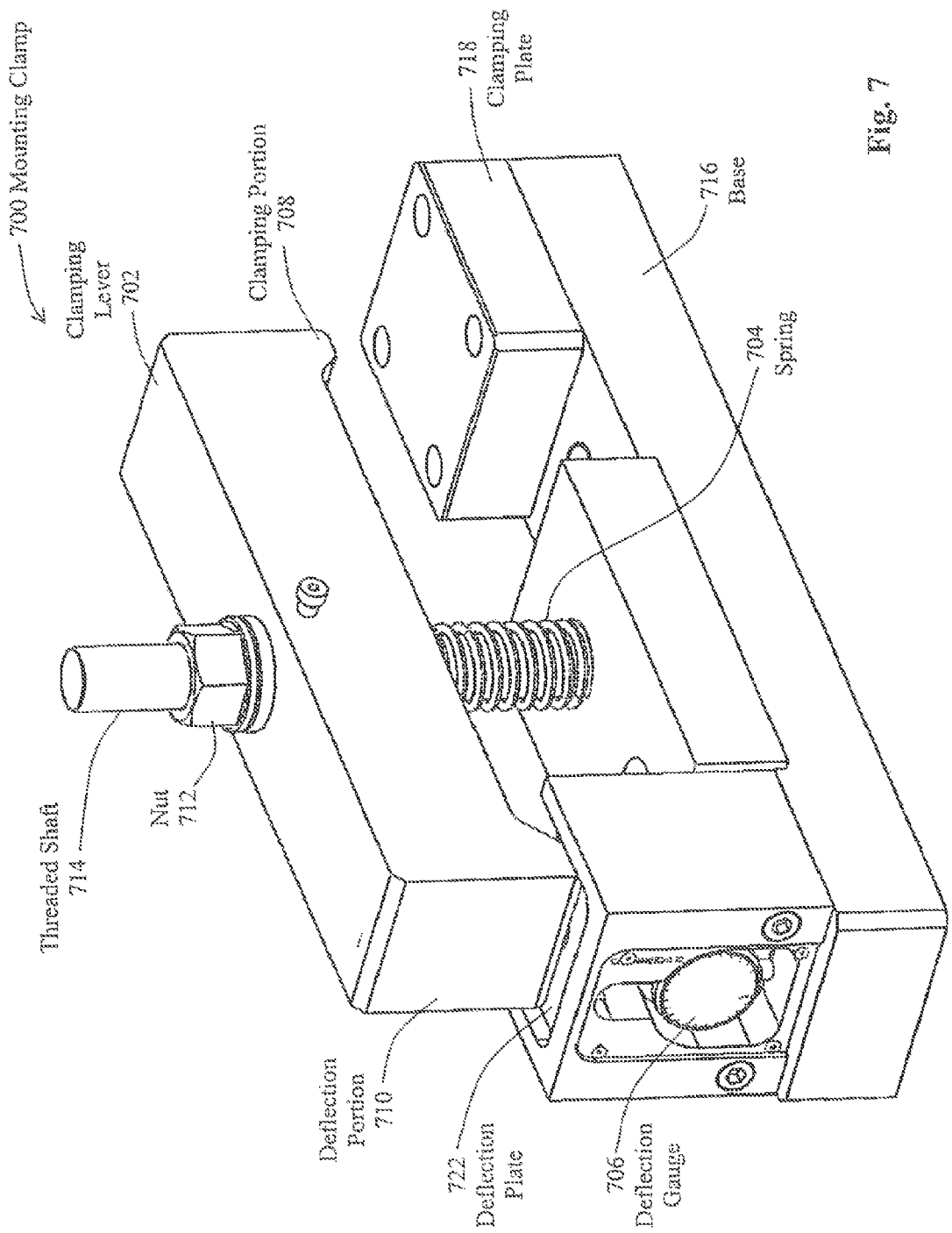
FIG. 7 is an isometric view of an embodiment of a configurable mounting clamp that comprises one of the configurable mounting pieces.

FIG. 7 is a schematic isometric view of an embodiment of a mounting clamp 700. As illustrated in FIG. 7, a clamping lever 702 is coupled to a base 716 with a threaded shaft 714. Nut 712 exerts pressure on the clamping lever 702, which results in a clamping force to hold the work piece 726 (FIG. 9) between the clamping portion 708 and the clamping plate 718 as explained in more detail below. The clamping portion 708, as well as the clamping plate 718, can be made of a hardened steel, so that high clamping forces can be generated to hold the work piece between the clamping portion 708 and the clamping plate 718. Spring 702 holds the clamping lever 702 apart from base 716, so that a flange, or other portion, of a work piece 726 (FIG. 9) can be easily disposed between the clamping portion 708 and clamping plate 718. In this manner, the operator that is clamping the work piece 726 (FIG. 9) in the mounting clamp 700 does not have to lift the clamping lever 702, which may be quite heavy. During the process of mounting the work piece (not shown) in the mounting clamp 700, the clamping lever 702 can be rotated so that the work piece can be vertically placed onto the clamping plate 718 without interference from the clamping lever 702. The clamping lever 702 can then be rotated back into the position illustrated in FIG. 7 and the nut 712 tightened, i.e., rotated on the threaded shaft 714 to force the clamping lever 702 toward the base 716 until the clamping portion 708 of the clamping lever 702 creates a sufficient amount of pressure on the work piece 726, as explained in more detail below, to adequately hold the work piece 726 in a secure manner on the mounting clamp 700. The amount of clamping force that is desired to be generated by a mounting clamp, such as mounting clamp 700 illustrated in FIG. 7, can be determined and selected based upon the forces that are expected to be created by the work piece on the mounting clamp, as the configurable table, such as configurable table 106, is rotated by a positioner, such as positioner 100, with the work piece mounted by the mounting clamp 700 on the configurable table. In that regard, it is desirable to have a preselected preloading force i.e., clamping force, that is created by the configurable mounting pieces 108 in FIG. 6, including the mounting clamp 700, that exceeds the forces that are created by the work piece on the clamps during positioning and rotation of the work piece. Certainly, the preloading force of each clamp should exceed the portion of the weight of the work piece 726 that is being supported by each of the clamps, e.g., the mounting clamps 700. In addition, moment loading created when the work piece 726 is rotated by the configurable table 106 to certain positions, such as sideways positions, as well as momentum changes create additional forces that far exceed the simple weight of the work piece 726. If any of these forces exceed the clamping force of any particular clamp, e.g., the mounting clamp 700, the work piece 726 can move relative to the configurable table 106, which can cause additional problems. For example, a robotic welder must accurately locate the position of a weld and perform the welding at the prescribed position. If the work piece 726 moves relative to the configurable table 106, accurate positioning of the weld may not occur. Further, overloading of a clamp, e.g., the mounting clamp 700, that is not preloaded to a particular force can cause movement of the metal in the clamp, which may cause fatigue. Clamps may prematurely fail as a result of fatigue that occurs because of improper preloading. In one example, if a work piece weighs 5,000 lbs., each of the clamps, e.g., the mounting clamps 700, that are used to hold a work piece 726 on the configurable table 106 may be preloaded to a force of 15,000 lbs., so that no movement occurs when the work piece 726 mounted on the configurable table 106 by the mounting clamps 700 of the configurable table mounting pieces 108 is rotated to any particular position by a positioner, such as positioner 100 in FIG. 1.

In that regard, the application of a predetermined amount of torque on nut 712 may result in greatly different amounts of force being applied to the work piece 726 between the clamping portion 708 and clamping plate 718 (FIG. 9), as empirically determined during the use of various clamping devices. In other words, the torque on nut 712 is not a good indicator of the clamping force created by mounting clamp 700 on work piece 726 (FIG. 9). In order to accurately determine the clamping force, the mounting clamp 700, illustrated in FIGS. 7-10, uses a deflection gauge 706, which accurately measures the clamping force created between the clamping portion 708 and clamping plate 718 as explained in more detail below. Referring now primarily to FIG. 9, as the nut 712 is rotated on the threaded shaft 714 to force the clamping lever 702 downwardly (as viewed on the drawing paper) toward the base 716, the clamping portion 708 will eventually move into contact with the work piece 726, which is positioned on the clamping plate 718 and inhibits any further movement of the clamping portion 708 toward the base 716. Therefore, further rotation of the nut 712 on the threaded shaft 714 to force the clamp lever 702 farther downward toward the base 716 causes the clamp lever 702 to pivot under the nut 712, which acts as a fulcrum 713 facilitated by the dished washer 715 interfacing with the nut 712, so that the deflection portion 710 of clamping lever 702 pushes the deflection piston 730 against a spring resistance force $F_S$ of the deflection spring 724 (e.g., Belleville washer springs). The spring resistance force $F_S$ of the deflection spring 724 is applied by the deflection piston 730 to the deflection portion 710 of the clamping lever 702, whereupon the spring resistance force $F_S$ is then transferred by the clamping lever 702, constrained by the fulcrum 713, to the clamping portion 708 of the clamping lever 702, which applies the clamping force $F_C$ to the work piece 726. In other words, the spring resistance force $F_S$ is applied by the clamping lever 702 to clamp the work piece 726 to the clamping plate 718. Further tightening of the nut 712 onto the clamping lever 702 causes further downward deflection of the deflection portion 710 of the clamp lever 702, which causes further compression of the deflection spring 724 by the deflection piston 730. Such further compression of the deflection spring 724 increases the spring resistance force $F_S$ on the deflection portion 710 of the clamping lever 702, which results in a proportional increase in the clamping force $F_C$ applied by the clamping portion 708 of the clamping lever 702 to the work piece 726. A deflection plate 722 is attached to, or a part of, the deflection piston 730 so that the deflection plate 722 moves with the deflection piston toward and away from the base 716. The deflection gauge 706 measures the downward movement of the deflection plate 722, thus also the downward movement of the deflection piston 730 and the deflection of the deflection spring 724, which is substantially proportional to the spring resistance force FS generated by the deflection spring 724 on the deflection portion 710 and to the resulting clamping force $F_C$ applied by the clamping lever 702 to the work piece 726. Accordingly, the clamping force $F_C$ applied by the clamping portion 708 to the work piece 726 is a function of the spring resistance force $F_S$ of the deflection spring 724 (e.g., Belleville washer springs). Since the threaded shaft 714 is shown as mounted in substantially the center portion of the clamping lever 702 in the example mounting clamp 700 in FIGS. 7-9, the lever arm between the deflection portion 710 and the fulcrum 713 is substantially the same length as the lever arm between the fulcrum 713 and the clamping portion 708 of the clamping lever 702, whereby the amount of spring resistance force $F_S$ generated by the deflection spring 724 on the deflection portion 710 is substantially equal to the amount of clamping force $F_C$ created by the clamping portion 708 on the work piece 726 (FIG. 9) that is placed between the clamping portion 708 and the clamping plate 718. A spring, or spring washers, such as Belleville washers (collectively referred to as the deflection spring 724), that provides a substantially linear response of spring resistance force $F_S$ to deflection in the range of forces created by the clamping lever 702 can be used, as described below, to control the clamping force $F_C$ applied by the mounting clamp 700 to a work piece 726. The substantially linear resistive force response of the spring 724 to deflection, thus deflection of the deflection piston 730 and deflection plate 722, enables a substantially linear measurement of the clamping force $F_C$ applied by the clamping lever 702 to the work piece 726 by measurement of the deflection of the deflection piston 730 or deflection plate 722, which corresponds to deflection, e.g., compression, of the deflection piston 730. The deflection gauge 706 measuring such deflection can be easily calibrated to provide an accurate reading on deflection gauge 706 of the clamping force $F_C$ applied by the clamping lever 706 to the work piece 726 as a function of deflection. Deflection gauge 706 can be calibrated as a force indicating display, for example, by providing a rotatable cover plate that indicates the desired clamping force $F_C$ to hold the work piece 726, to be applied by rotating the nut 712 as explained above. For example, a force of 15,000 pounds may be an adequate clamping force to hold a work piece. The face of the deflection gauge can be rotated to a pre-marked location, so that when a force of 15,000 pounds is generated, the indicator of the deflection gauge 706 falls within a green range, or other indicated range, on the dial of the deflection gauge 706. In this manner, easy calibration can be performed by the user by simply rotating the cover plate of the deflection gauge 706 to the proper preset location for the desired force, and the nut 712 can be rotated until the indicator falls within the green range.

Figure 8:
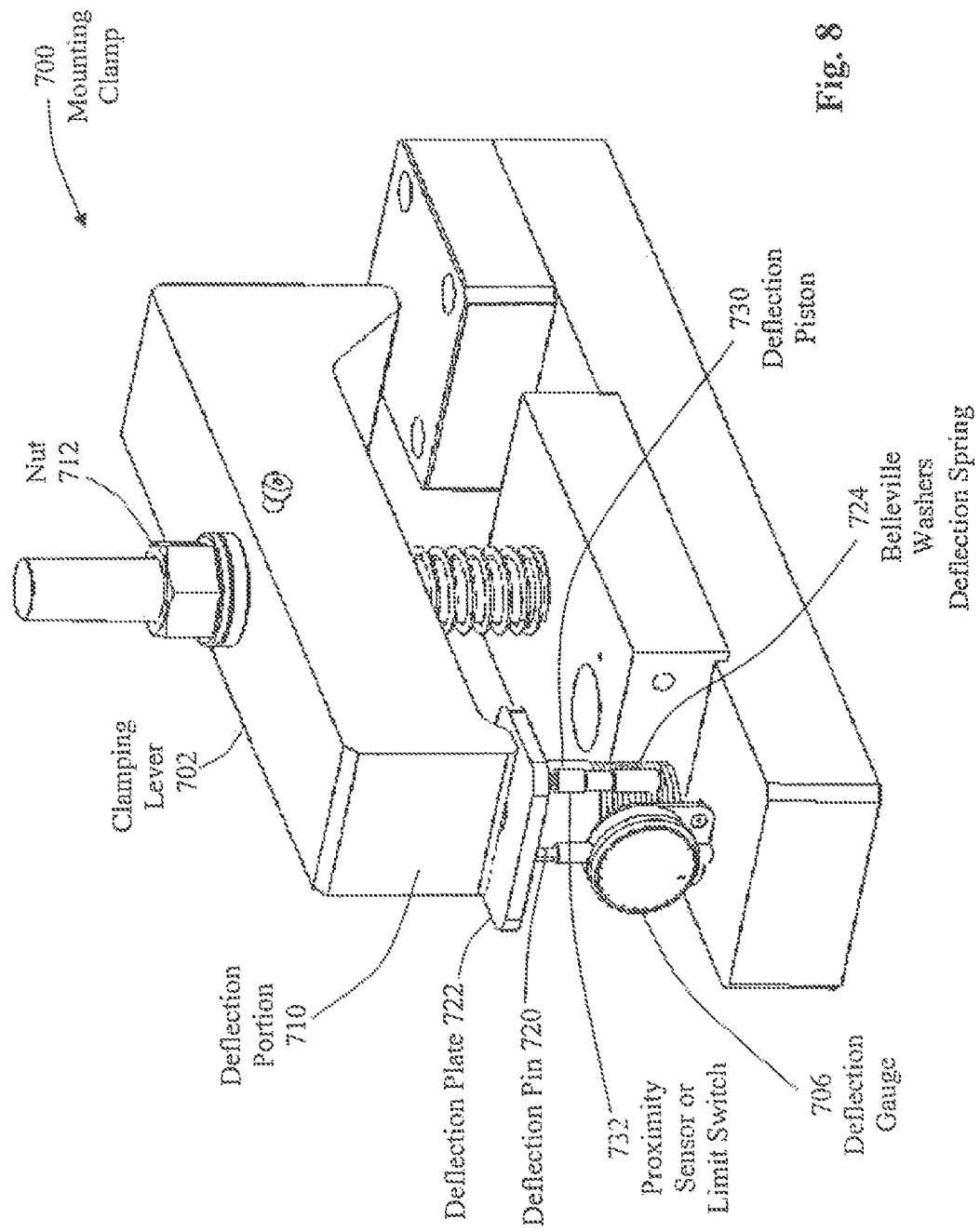
FIG. 8 is a transparency view of the embodiment of a configurable mounting clamp of the embodiment of FIG. 7.
Figure 9:
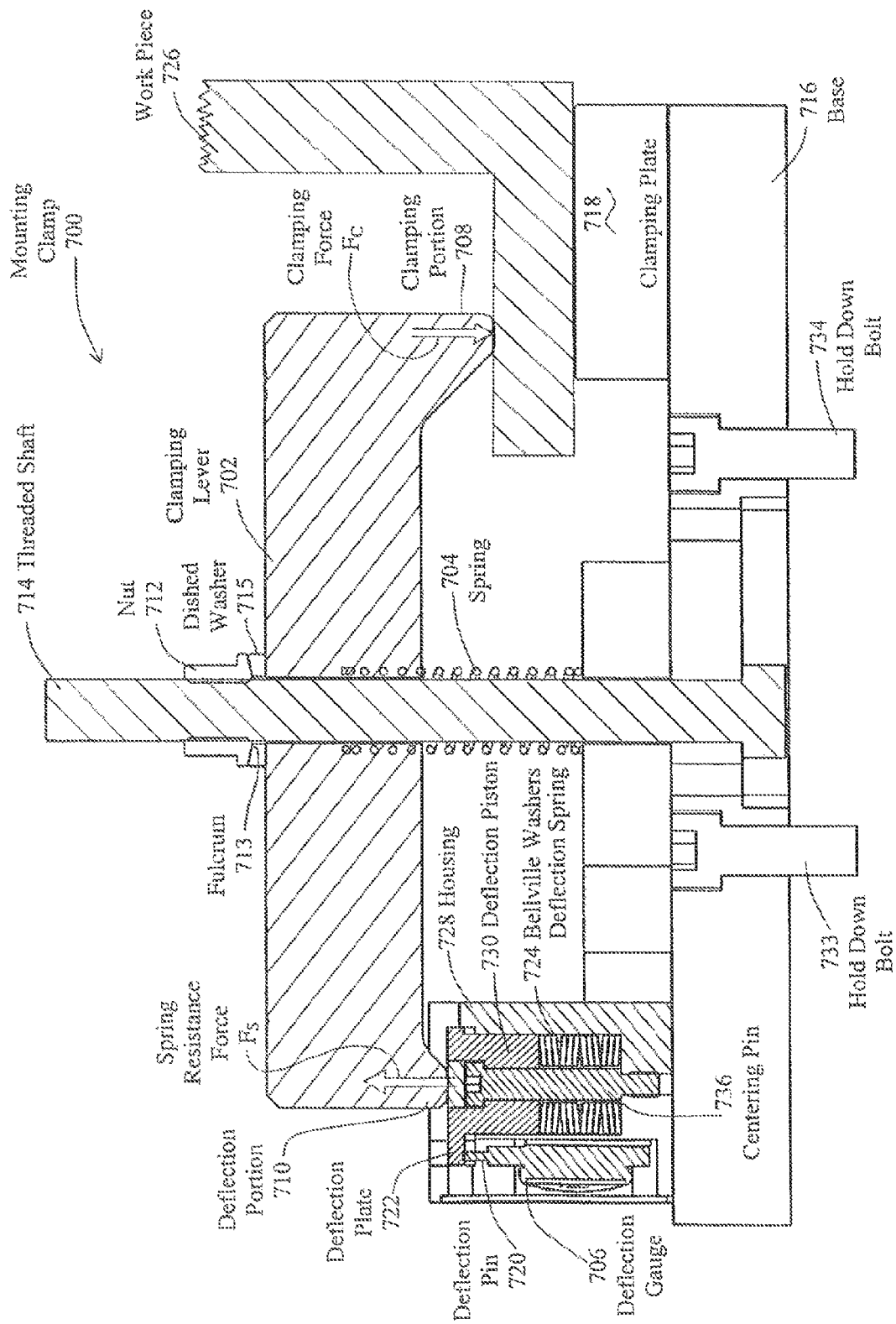
FIG. 9 is a side sectional view of the embodiment of the configurable mounting clamp illustrated in FIGS. 7 and 8.

FIG. 8 is an isometric view of the embodiment of the mounting clamp 700 similar to FIG. 7, but with the housing 728 (FIGS. 7 and 9) around the deflection gauge 706 removed in FIG. 8 to reveal the deflection pin 720, the deflection plate 722, the Belleville washers 724, the deflection piston 730, and the proximity sensor or limit switch 732 in relation to the deflection portion 710 of the clamping lever 702 and the deflection gauge 706. The deflection portion 710 of the clamping lever 702 engages the deflection plate 722. The deflection plate 722 forms a portion of, or is connected to, the deflection piston 730. Belleville washers 724, or other spring devices, that provide a linear response in the desired force range, are disposed adjacent to the deflection piston 730. When force is applied by the deflection portion 710 of clamping lever 702 to the deflection plate 722 and deflection piston 730, the Belleville washers 724 are compressed. The amount of deflection of the deflection plate 722 is substantially linearly proportional to the deflection of the Belleville washers 724, or other spring device as explained above. The deflection pin 720 of the deflection gauge 706 is disposed on the bottom portion of the deflection plate 722. The deflection pin moves as the deflection plate 722 moves downwardly. The deflection pin 720 causes the indicator on the deflection gauge 706 to rotate, indicating the amount of deflection of the deflection plate 722 on the indicator of the deflection gauge 706. The amount of deflection indicated on the deflection gauge 706 is proportional to the force of the deflection portion 710 on the deflection plate 722, as long as the Belleville washers 724, or other spring devices, are operating in the linear range of forces that are desired to be measured by the deflection gauge 706. In other words, the orientation of Belleville washers 724, and the number of Belleville washers 724, are selected to provide a linear response in a desired force range, such as from 5,000 to 20,000 pounds, in one example. Of course, the spring resistance force can be varied by varying the number and orientation of washers, as well as the spring strength, so that different forces can be measured by the deflection gauge 706. As set forth above, marking indicators can be provided on the bezel of the deflection gauge 706, as well as the housing of the deflection gauge 706, so that the bezel can be rotated to provide an indication of a desired force generated by clamping lever 702 by aligning the markings on the bezel and the housing. For example, if a desired force is 15,000 pounds, the bezel of the deflection gauge 706 can be rotated to be aligned with a marking on the housing indicating 15,000 pounds. A green portion can be placed on the face of the deflection gauge 706 to indicate when a force of 15,000 pounds is generated. In this manner, accurate measurement of the force can be created using a standard deflection gauge.

FIG. 8 also illustrates a proximity sensor or limit switch 732, that can be optionally used in the mounting clamp 700, and may be used to replace, or use in conjunction with, the deflection pin 720 and deflection gauge 706. The proximity sensor/limit switch 732 can sense the location of the deflection plate 722 and thereby determine the force that has been applied by the deflection portion 710 on the deflection plate 722. In addition, a limit switch may be used to automatically indicate when the deflection plate 722 has moved sufficiently to generate the desired force. At that point, an indicator may provide an indication that the required force has been created, so that a user no longer has to tighten the nut of the mounting clamp 700. This may be in the form of an LED, or other visual indication, including mechanical visual indicators. Further, a limit switch 732 may provide an electrical signal to stop an automated operation of tightening the mounting clamp 700. For example, the limit switch may send a signal to stop a hydraulic or pneumatic force generator (not shown), which causes an automatic cessation of rotation of the nut 712, or other control. The device 732 can function either as a proximity switch or a limit switch, or as both.

FIG. 9 is a sectional view of the mounting clamp 700. As illustrated in FIG. 9, the threaded shaft 714 is mounted in, and secured to, the base 716. Nut 712 rotates on the threaded shaft 714 and generates a force against clamping lever 702. Spring 704 creates a force between the base 716 and clamping lever 702 sufficient to maintain the clamping lever 702 in a position so that a gap exists between the base 716 and the clamping lever 702. Spring 704 is sized to simply offset the weight of the clamping lever 702. As torque is applied to the nut 712, the clamping lever 702 moves downwardly and creates a force between the deflection portion 710 of the clamping lever 702 on deflection plate 722 while clamping the work piece 726 between the clamping portion 708 of the clamping lever 702 and the clamping plate 718. Again, since the threaded shaft 714 in the example mounting clamp 700 in FIGS. 7-9 is centrally disposed in the clamping lever 702, tightening the nut 712 creates a substantially even force at the deflection portion 710 on the deflection plate 722 and at the clamping portion 708 on the workpiece 726. Clamping portion 708 creates the clamping force on work piece 726, which is clamped between the clamping portion 708 of the clamping lever 702 and the clamping plate 718. The clamping plate 718 is mounted on the base 716 of the mounting clamp 700. As explained above, the deflection plate 722 forms a portion of, or is connected to, the deflection piston 730. The deflection piston 730 is mounted in the housing 728. In addition, Belleville washers 724 are also disposed in the housing 728 below the deflection piston 730. Centering pin 736 centrally locates the deflection piston 730 and deflection plate 722 in the housing 728. Deflection gauge 706 is mounted so that deflection pin 720 is disposed against the deflection plate 722. When the deflection plate 722 deflects in a downward direction, because of the compression of the Belleville washers 724 in response to a force applied by the nut 712 on the clamping lever 702, the deflection pin 720 is pushed downwardly, which moves the indicator on the deflection gauge 706. Hold down bolts 733, 734 are provided to hold the mounting clamp 700 securely to the configurable table 106 (FIG. 6).

Figure 10:
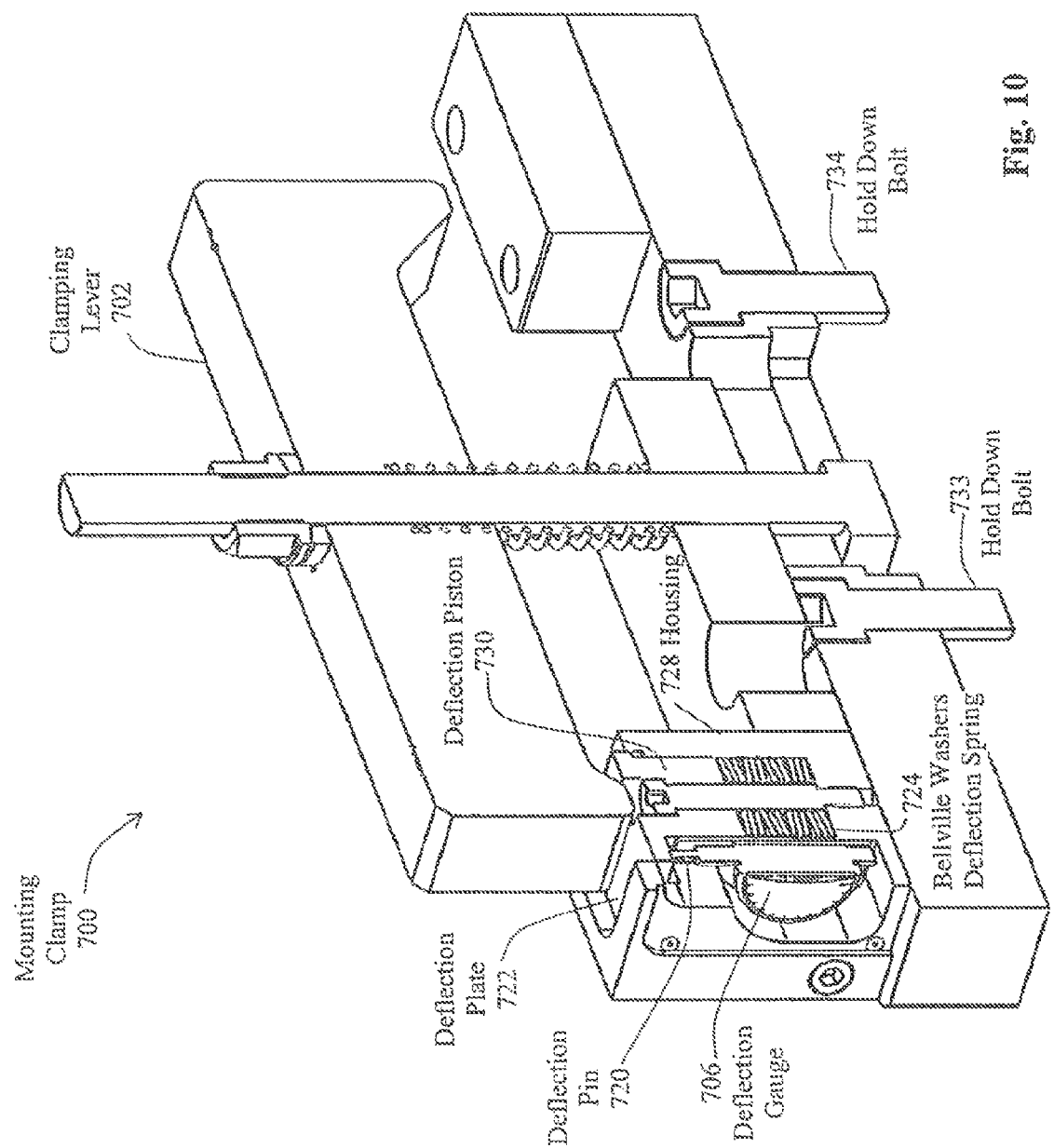
FIG. 10 is an isometric sectional view of the configurable mounting clamp illustrated in FIGS. 7, 8 and 9.

FIG. 10 is an isometric sectional view of the mounting clamp 700. As illustrated in FIG. 10, the clamping lever 702 generates a force on the deflection plate 722. The deflection plate 722 and the deflection piston 730 may comprise a single piece. Forces generated on the deflection plate 722 and deflection piston 730 are transmitted to the Belleville washers 724. The Belleville washers 724 compress and cause the deflection piston 730 and deflection plate 722, to move downwardly against the deflection pin 720, thereby moving the deflection pin 720 in a downward direction. The deflection gauge 706 is statically mounted so that the movement of the deflection pin 720 causes an indicator on the deflection gauge 706 to move. The movement of the deflection pin is an indication of the force generated by the clamping lever 702 on the deflection plate 722. Hold down bolts 733, 734 hold the mounting clamp 700 to the configurable table 106.

The mounting clamp 700, illustrated in FIGS. 7-10, is one example of the manner in which a clamp can be made, which includes a force indicator. Various other types of designs can be employed, such as hydraulically or pneumatically operated clamps, force indicators disposed in datum devices that indicate the force generated by a pusher, other types of mechanically operated clamps, etc. In addition, the mounting clamp 700 indicates the force that is generated by the clamp by measuring the deflection of springs, which include Belleville washers. Other types of springs can be used and other types of force indicators can be used besides deflection gauges, including switch devices that indicate a predetermine deflection. Further, forces can be measured directly without measuring deflection, such as by using piezoelectric devices, or other force sensing devices.

Figure 11:
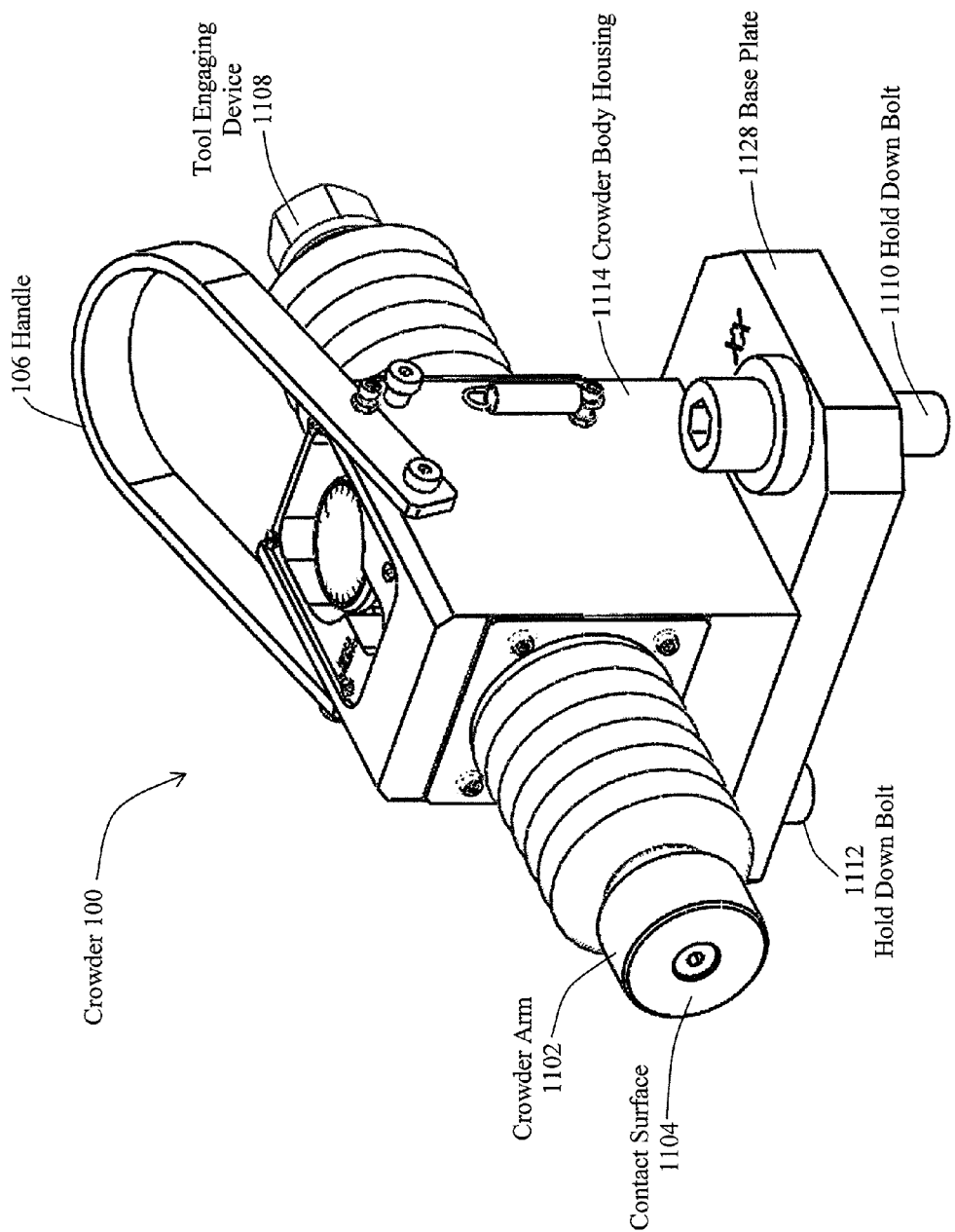
FIG. 11 is an isometric view of an embodiment of a crowder that comprises one of the configurable mounting tools.
Figure 12:
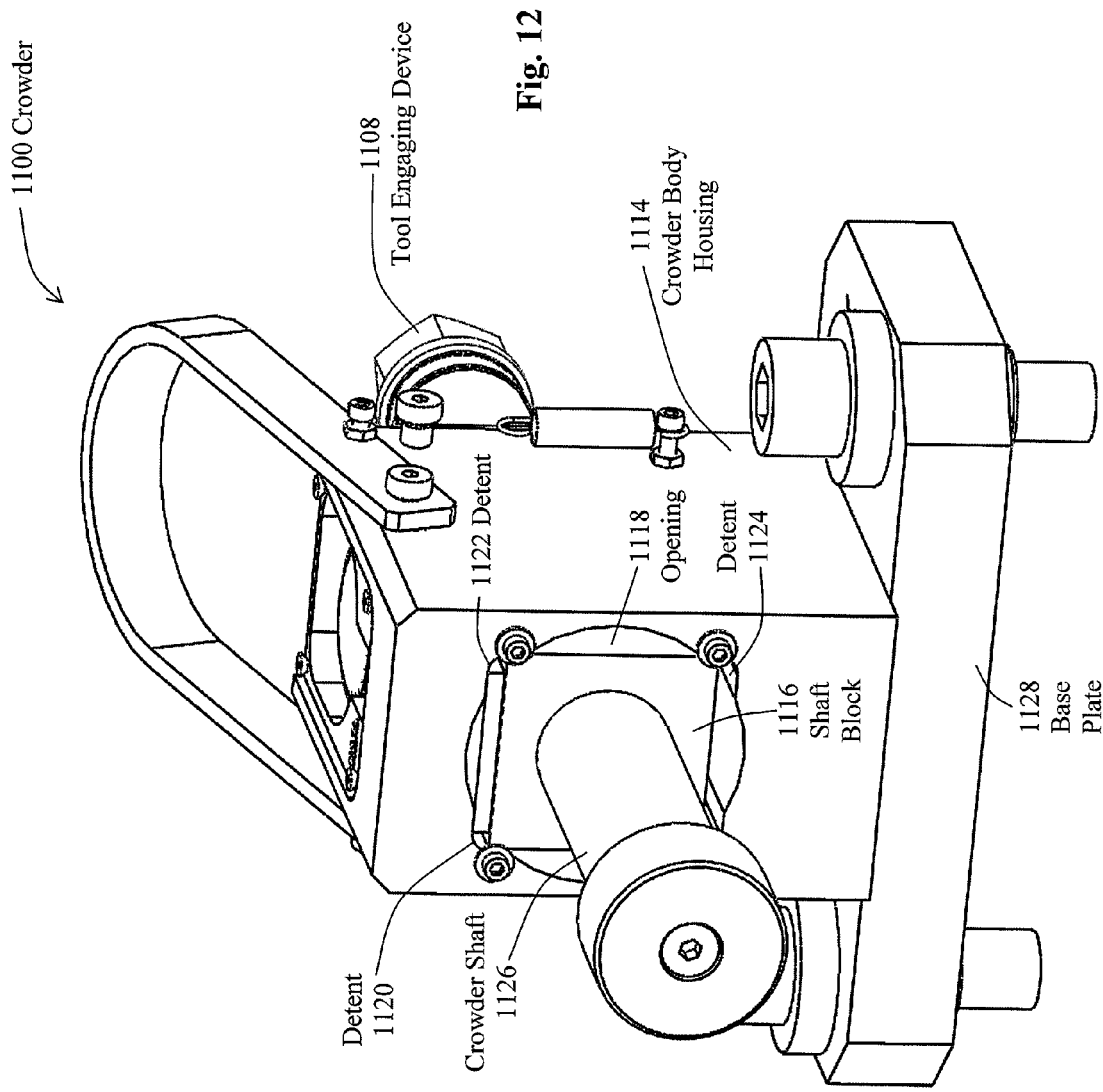
FIG. 12 is a schematic cutaway view of the crowder illustrated in FIG. 11.

FIG. 11 is a isometric view of an embodiment of a crowder 1100. As illustrated in FIG. 11, crowder 1100 is mounted on the configurable table 106 (not shown in FIG. 11, but shown in FIG. 6) with hold down bolts 1110, 1112 and generates a force on the work piece 726 (not shown in FIG. 11, but shown in FIG. 9) to position the work piece 726 against a datum, such as datum 1400, illustrated in FIG. 14. The crowder 1100 generates a force in a horizontal direction, which is capable of moving and positioning the work piece 726 against the datum, so that a pre-programmed robot can perform welding, machining, cutting, or other tasks at an accurate location on the work piece 726. Once the crowder 1100 is bolted to the configurable table 106 (not shown in FIG. 11, but shown in FIG. 6), the tool engaging device 1108 can be rotated, which causes the contact surface 1104 of the crowder arm 1102 to engage the work piece 726 on the contact surface 1104 and force the work piece 726 into a position on the configurable table 106 against a datum. The tool engaging device 1108 can comprise any desired type of tool engaging device, such as the hexagonally shaped portion of the crowder shaft 1126 (FIG. 12), socket extension opening, a square shaped driver, or any other type of tool engaging device. Handle 1106 is releasably connected to the crowder body housing 1114, which allows the crowder 1100 to be lifted and positioned in the proper location for connection to the configurable table 106. Handle 1106 can be easily removed from the crowder body housing 1114 and used with many of the other configurable mounting pieces 108. Additionally, the crowder 1100 can be driven by other means, such as by a hydraulic or pneumatic driver, or other type of mechanical force generating device FIG. 12 is an isometric view of the crowder 1100 illustrated in FIG. 11. As shown in FIG. 12, the bellows and bellows plate have been removed, so that the crowder shaft 1126 and shaft block 1116 are visible. The crowder body housing 1114 has an opening 1118, in which the shaft block 1116 is disposed. Both the crowder shaft 1126, as well as the shaft block 1116, are threaded, so that turning of the crowder shaft 1126 causes the crowder shaft 1126 to move laterally with respect to the shaft block 1116. A series of detents 1120, 1122, 1124, as well as an additional detent not visible in FIG. 12, support the shaft block 1116 in the opening 1118 of the crowder body housing 1114, but allow the shaft block to move laterally. In addition, the detents 1120, 1122, 1124 keep the shaft block 1116 from rotating in the crowder body housing 1114, when the crowder shaft 1126 is turned. In this manner, rotation of the tool engaging device 1108 causes the crowder shaft 1126 to extend or retract laterally in the crowder body housing 1114.

Figure 13:
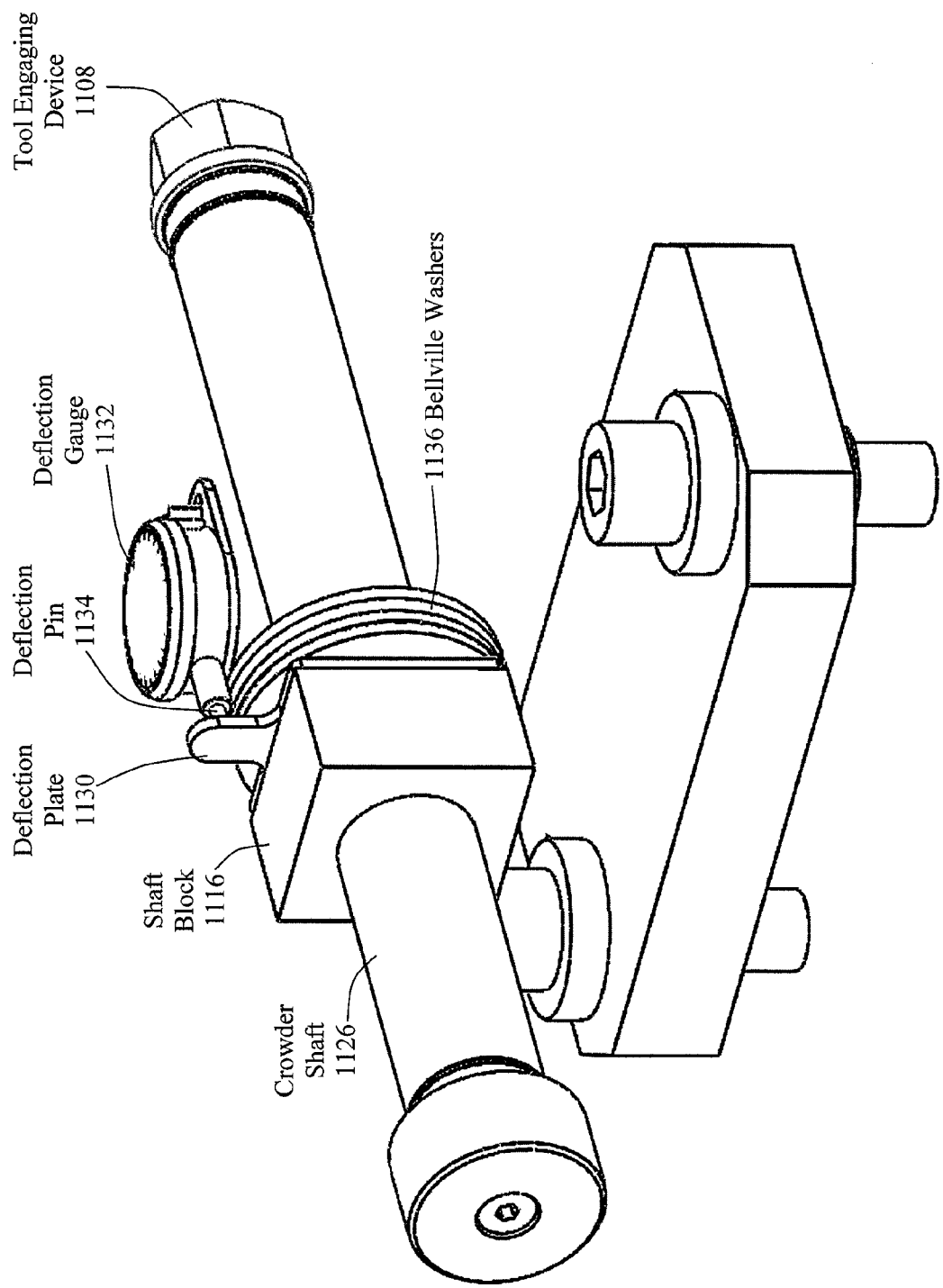
FIG. 13 is a schematic cutaway view of the crowder illustrated in FIGS. 11 and 12.

FIG. 13 is a side isometric view of the embodiment of FIG. 11, illustrating components of the crowder 1100. As illustrated in FIG. 13, crowder shaft 1126 is threaded through the shaft block 1116. When the contact surface 1104 pushes against the work piece, the shaft block 1116 moves laterally to the right against the Belleville washers 1136, or other spring device. A deflection plate 1130, that is in contact with the shaft block 1116, also moves with the shaft block 1116. The Belleville washers 1136 are compressed against a surface of the crowder body housing 1114 (not shown) and allow the shaft block 1116 and the deflection plate 1130 to move laterally to the right. This causes the deflection pin 1134 to be depressed, which causes an indicator on the deflection gauge 1132 to display the amount of deflection. The amount of deflection indicated by the deflection gauge 1108 is proportional to the force applied by the crowder shaft 1126 on the work piece. In this manner, an accurate reading of the force can be obtained by the deflection gauge 1132.

Figure 14:
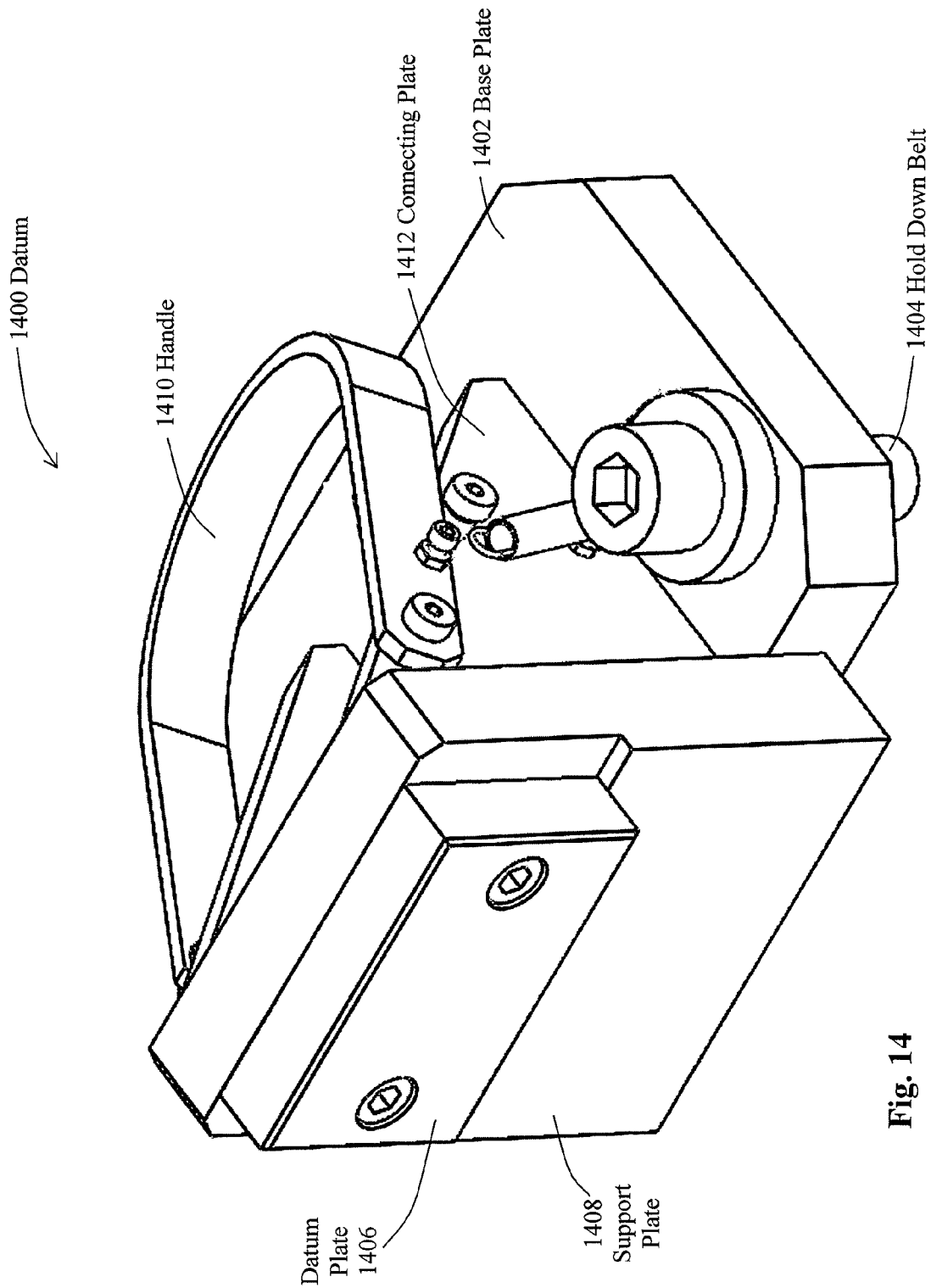
FIG. 14 is an isometric view of an embodiment of a datum that comprises one of the configurable mounting tools.

FIG. 14 is an isometric view of an embodiment of a datum 1400. As illustrated in FIG. 14, the datum 1400 has a base plate 1402 and a hold down bolt 1404 that holds the base plate 1402 to the configurable table 106. Another hold down bolt 1414 (FIG. 15) is also used to hold the base plate 1402 to the configurable table 106. A support plate 1408 is connected to the base plate 1402 with a connecting plate 1412. A datum plate 1406, made of hardened metal, is coupled to the support plate 1408. The surface of the datum plate provides a datum point to accurately locate the work piece with respect to the configurable table 106. Handle 1410 is used to lift and transport the datum 1400 and can be removed after the datum 1400 is placed on the configurable table 106.

Figure 15:
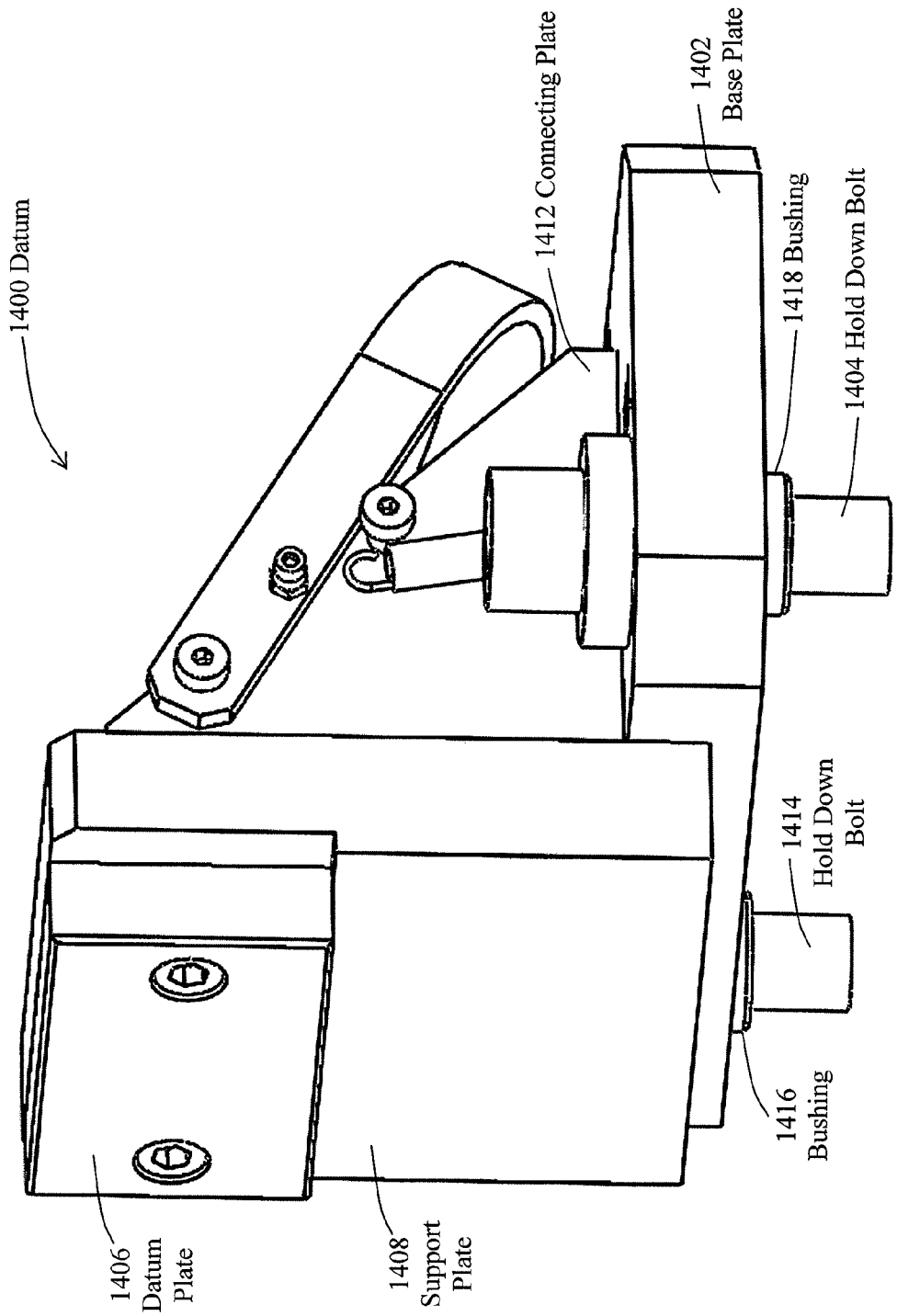
FIG. 15 is a side isometric view of the embodiment of a datum illustrated in FIG. 14.

FIG. 15 is a side isometric view of the datum 1400 illustrated in FIG. 14. As shown in FIG. 15, hold down bolts 1404, 1414 hold the base plate 1402 to the configurable table 106 (FIG. 1). Connecting plate 1412 and another connecting plate (not shown) connect the support plate 1408 to the base plate 1402 and provide additional support for the support plate 1408 when large pressures are applied to the datum plate 1406. In addition, the support plate 1408 is welded to the base plate 1402 to assist in securely attaching the support plate 1408 to the base plate 1402.

As also illustrated in FIG. 15, the datum 1400 includes bushings 1416, 1418. These bushings are mounted in recesses in the configurable table, such as configurable table 106 (FIG. 1), to accurately locate the datum 1400 with respect to the surface of the configurable table 106. For example, the threaded openings 128, illustrated in FIG. 4, may include a recess that is not threaded on a top portion of the top plate 130 (FIG. 4) that closely matches the dimensions of the bushings 1416, 1418 to precisely locate the datum 1400 on the configurable table 106. Since the hold down bolts 1414, 1404 may have play associated with the openings in the base plate 1402, the hold down bolts 1414, 1404 may not provide the precise positioning of the datum 1400 on the configurable table 106. Of course, each datum, such as datums 110, 112, illustrated in FIG. 1, as well as all of the configurable pieces 108, can include bushings, such as bushings 1416, 1418 to accurately locate the configurable mounting pieces 108 on the configurable table 106.

Figure 16:
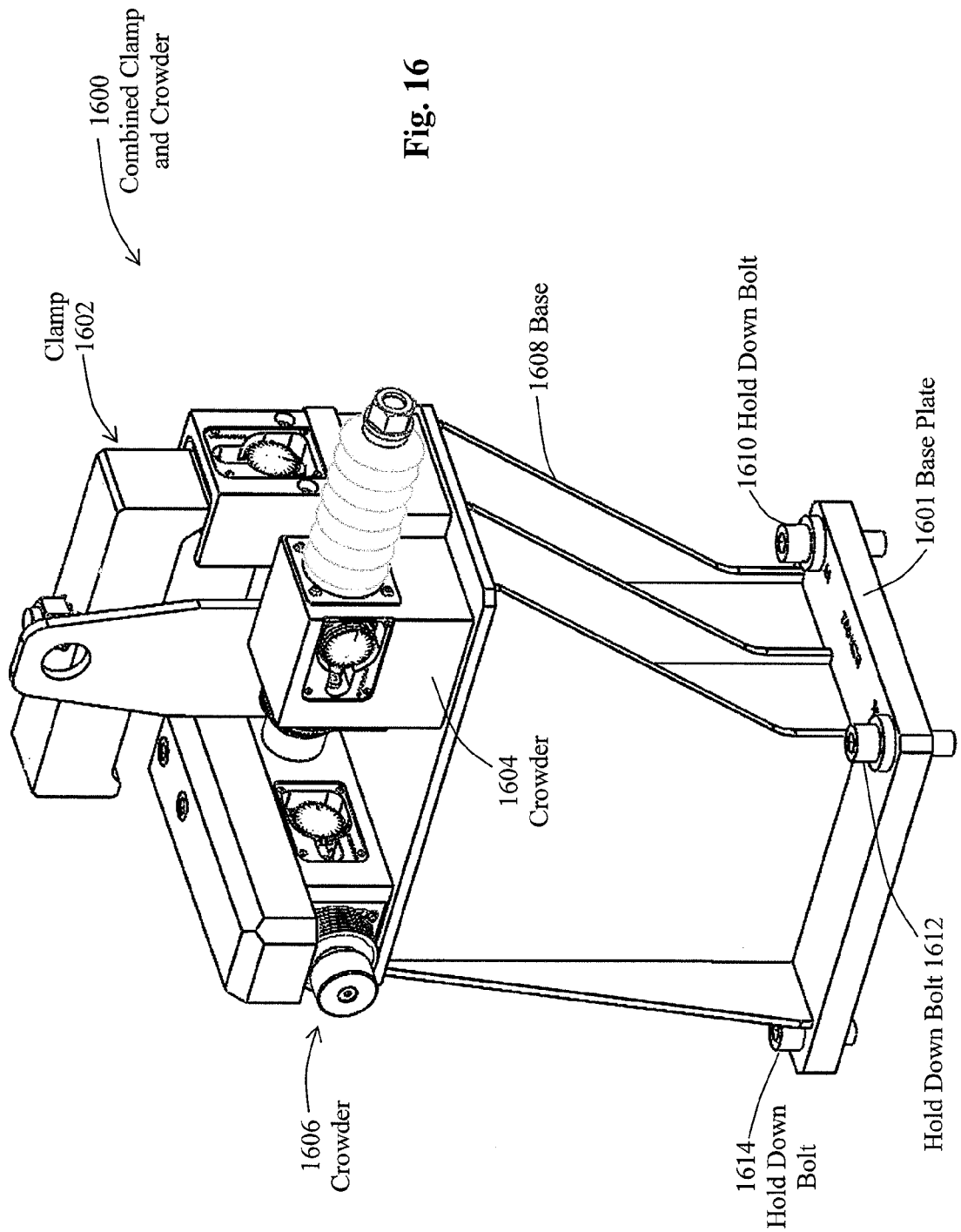
FIG. 16 is an isometric view of an embodiment of a combined clamp and crowder.

FIG. 16 is an isometric view of an embodiment of a combined clamp and crowder. As shown in FIG. 16, a base 1608 is attached to a base plate 1601. Hold down bolts 1610, 1612, 1614 secure the base plate 1601 and the base 1608 to the configurable table 106 (FIG. 1). Another hold down bolt (not shown) is also used to secure the base plate 1601 to the configurable table 106. Base 1608 supports clamp 1602, crowder 1604 and crowder 1606. Crowder 1604 and crowder 1606 apply a force to the work piece to ensure that the work piece is securely positioned against at least two datums (not shown). Clamp 1602 secures the work piece to the configurable table 106 and substantially prevents movement of the work piece with respect to the configurable table 106. Of course, any desired configuration of clamps, crowders and datums can be used to position and secure a work piece to a configurable table, such as configurable table 106.

Figure 17:
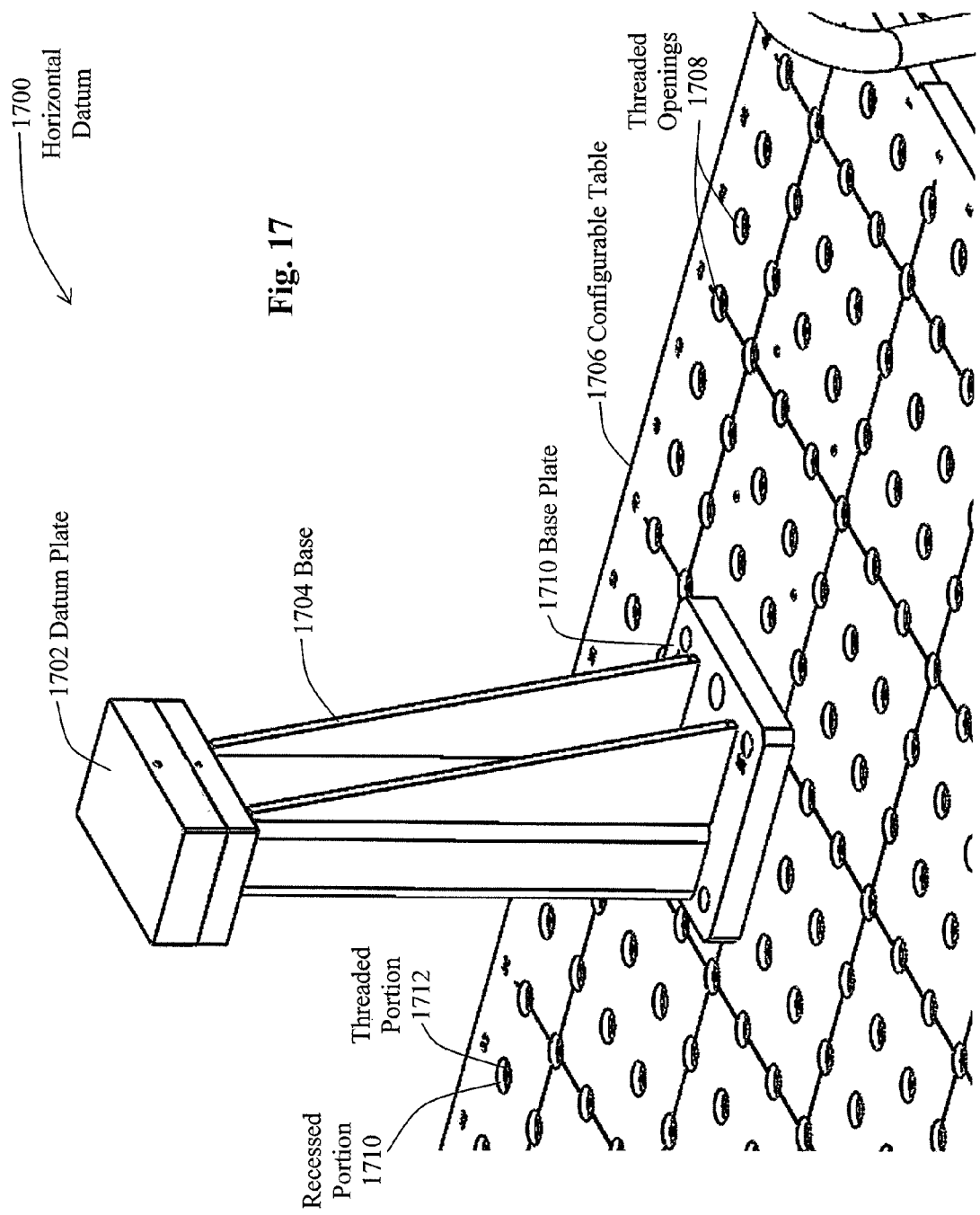
FIG. 17 is an isometric view of an embodiment of a horizontal datum.

FIG. 17 is an isometric diagram of a horizontally disposed datum 1700. The horizontally disposed datum 1700 is substantially parallel to the surface of the configurable table 1706 and provides a datum plane for vertically locating a work piece. The datum plate 1702 is supported by a base 1704 that is welded or otherwise attached to a base plate 1710. The base plate 1710 is attached to the configurable table 1706 with bolts (not shown) that engage the threaded opening 1708. As also shown in FIG. 17, the openings have a recessed portion 1710 and a threaded portion 1712. As disclosed above, the recessed portion 1710 matches the bushings, such as bushings 1416, 1418 (FIG. 15) to precisely locate the datum or other configurable mounting pieces on the configurable mounting table 1706. Again, the tolerances of the recessed portion 1710 and the bushings on the datum, such as horizontal datum 1700, are closely matched, so that the horizontal datum 1700 is accurately located on the configurable table 1706.

Figure 18:
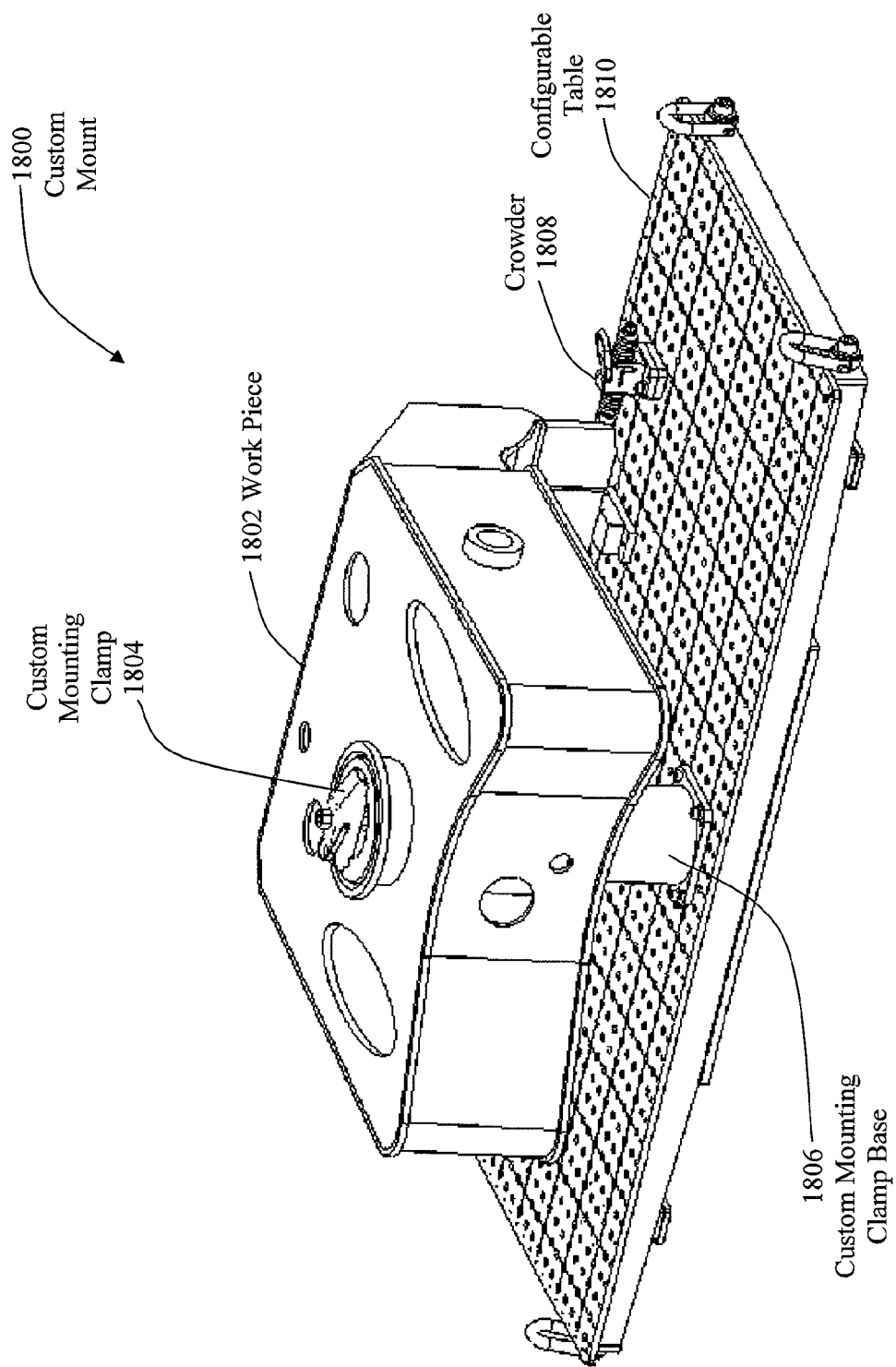
FIG. 18 is an isometric view of an embodiment of a work piece mounted on a configurable table.

FIG. 18 is an isometric view of a custom mounting design 1800. As shown in FIG. 18, a work piece 1802 is positioned and attached to the configurable table 1810 using crowder 1808. In addition, custom mounting clamp 1804 and custom mounting clamp base 1806 secure the work piece 1802 to the configurable table 1810. The configuration illustrated in the custom mounting assembly 1800 shows the manner in which unique custom work pieces can be secured to the configurable table 1810 in various ways.

Figure 19:
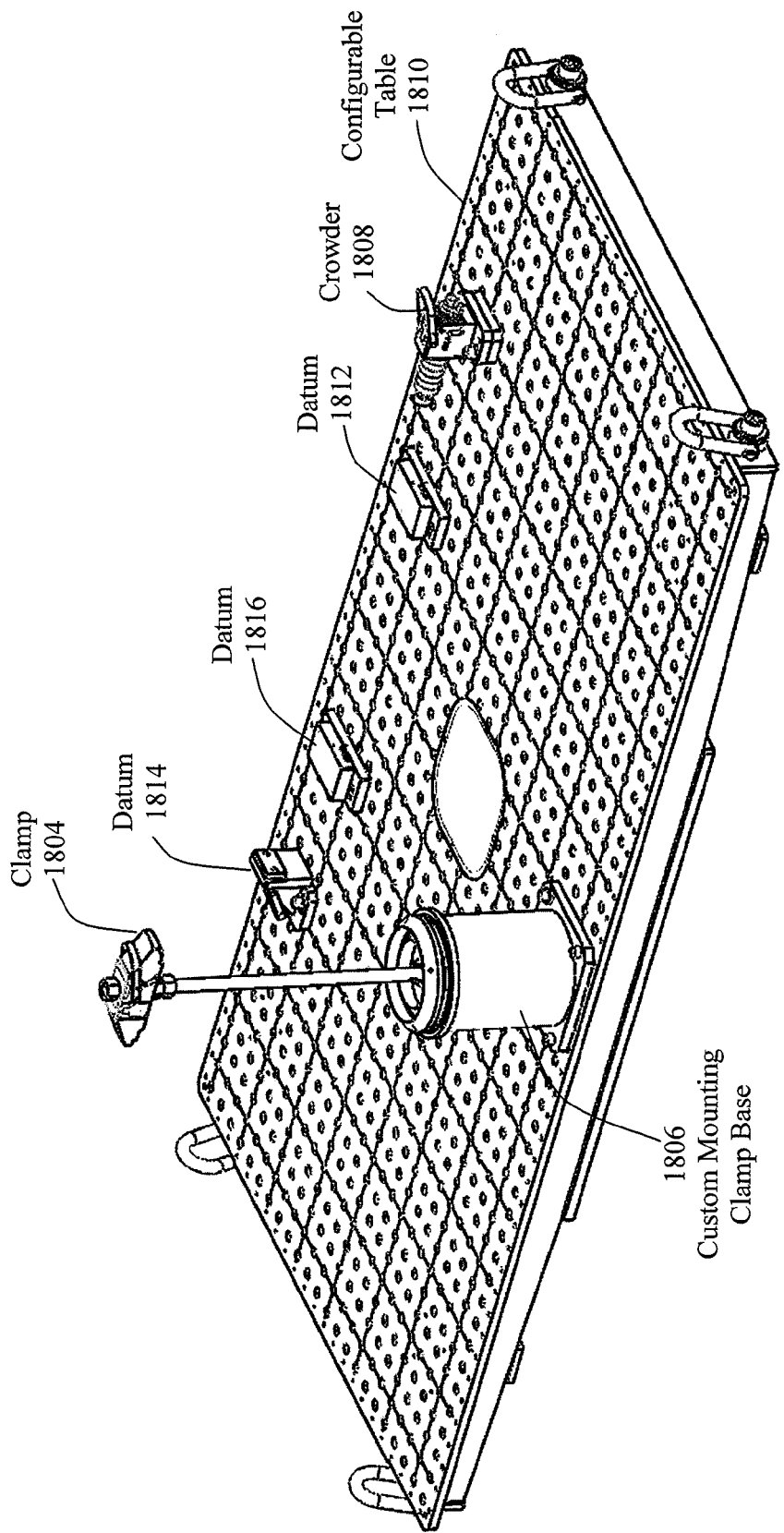
FIG. 19 is an isometric view of a custom mounting clamp used to clamp the work piece illustrated in FIG. 18.

FIG. 19 is an illustration of the configurable mounting pieces utilized in the custom mounting design illustrated in FIG. 18. As shown in FIG. 19, the custom mounting base 1806 holds the work piece 1802 in position, while the custom mounting clamp 1804 secures the work piece 1802 to the custom mounting clamp base 1806. Datums 1812, 1814, 1816 accurately locate the other end of the work piece 1802 on the configurable table 1810. In this manner, the work piece 1802 is both secured and accurately located on the configurable table 1810.

FIG. 20 is an illustration of another embodiment that uses positioners in conjunction with a configurable table. As illustrated in FIG. 20, a configurable table 2000, such as described above, can be mounted to positioners 2006, 2008, with quick release clamps 2002, 2004. As shown in FIG. 20, the configurable table 2000 can be rotated around a single axis, together with a work piece that is secured to the configurable table 2000. In fact, the configurable table 2000 can be attached using quick release clamps, such as quick release clamps 2002, 2004 on any portion of the configurable table to provide the desired rotation of the work piece for robotic welding. Any desired type of release clamp can be used, including quick release clamps, such as quick release clamps 2002, 2004, or the rotatable mounting clamp 118, illustrated in FIG. 2. Non-quick release clamps can also be used. Further, the positioners 2006, 2008 can be mounted on a positioning arm to provide another axis of rotation. In this manner, a work piece mounted on the configurable table 2000 can be positioned as desired for robotic welding.

Figure 21:
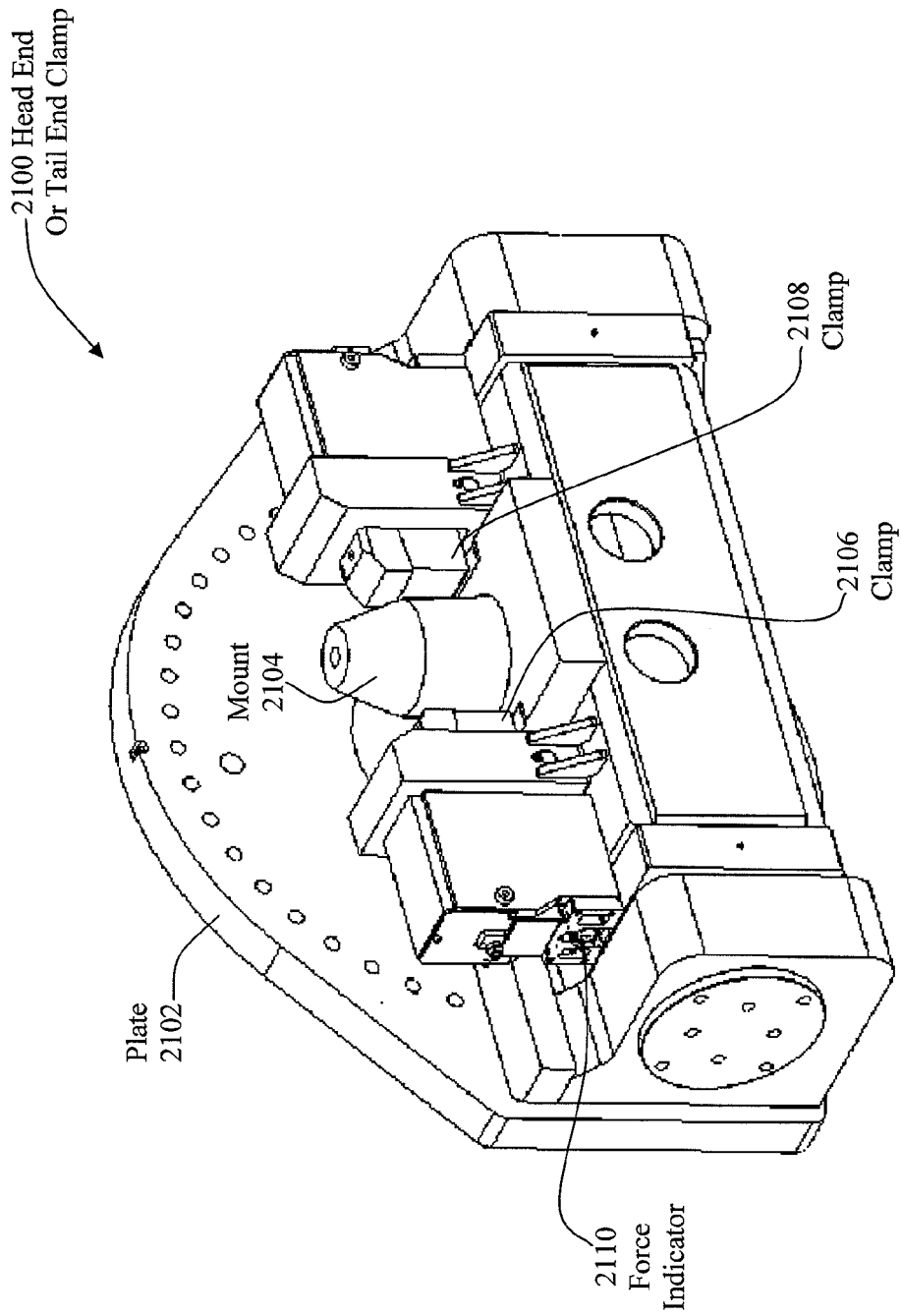
FIG. 21 is an isometric view of an embodiment of a head end or tail end clamp 2100

FIG. 21 is an isometric view of an embodiment of a head end or tail end clamp 2100. The head end or tail end clamp 2100 is connected to a positioning arm by way of plate 2102. Mount 2104 is used to mount either a work piece or a configurable table, such as configurable table 2000, illustrated in FIG. 20. Clamps 2106, 2108 clamp the work piece or configurable table to the head end or tail end clamp 2100. A force indicator 2110 indicates the clamping force that is generated by clamps 2106, 2108 to hold the work piece or configurable table securely to the head end or tail end clamp 2100. Accordingly, force indicators, such as deflection dials and other indicating devices, can be used in the mounting clamps to provide a visual indication or other indication that sufficient clamping force has been generated by the mounting clamp.

Hence, the embodiments illustrated herein are capable of locating and securing large and heavy work pieces on a configurable table using configurable mounting pieces. The configurable mounting pieces additionally provide an indication of a proper clamping force, using integrated force meters. The configurable mounting pieces include datums and crowders for accurately positioning the work piece on the configurable table. The configurable table includes a fixed portion of a mounting clamp that interfaces with a moveable portion of a mounting clamp that can be located on a positioner, so that the work piece can be moved in various orientations for machining, cutting and welding. Since welds are ideally performed in a horizontal orientation, a positioner can be used to perform automated welding using robotic welding devices that perform the welding processes when the positioner places the weld in a horizontal orientation. In this manner, high quality and consistent welds can be performed. In addition, the configurable table 106 can be used for initial fabrication prior to robotic finish welding, so that a separate fabrication table does not have to be employed and both fabrication and finish welding can be performed on a single table. The configurable mounting pieces generate a consistent and adequate force to hold the work piece to the configurable table, while the work piece is rotated into various orientations. The two-piece rotatable mounting clamp allows multiple tables to be used with a single positioner, with the less expensive fixed portion disposed on the configurable table. In this manner, efficiency is increased by allowing multiple stages of fabrication on multiple tables to occur simultaneously. The Belleville washers disclosed herein can be replaced with various types of springs. For example, a coil spring can be used that has a linear response in the range of forces to be asserted by the clamp or crowder, so that a substantially linear measurement of force can be detected using a deflection gauge. Other types of spring washers, as well as other spring devices can be utilized to create a substantially linear deflection versus force curve in the contemplated force ranges.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A clamp for securing a work piece to a configurable table by generating a desired clamping force that is sufficient to immovably hold said work piece to said configurable table when said configurable table is moved to various orientations in three dimensional space comprising:
   a base that secures said clamp to said configurable table, said configurable table having a mounting surface to which said base is mounted in a selected location, said configurable table capable of moving said work piece to said various orientations;
   a deflection piston mounted on said base, said deflection piston disposed to move transversely to said mounting surface of said configurable table;
   a deflection plate that engages said deflection piston, said deflection plate disposed to move in a direction that is transverse to said mounting surface of said configurable table when said deflection plate is deflected, which causes said deflection piston to move transversely to said mounting surface;
   spring washers disposed under a lower surface of said deflection piston so that deflection of said deflection plate causes said spring washers to compress, said spring washers selected to compress proportionally in response to forces in a range of forces applied to said deflection plate that includes said desired clamping force;
   a deflection gauge disposed under a lower surface of said deflection plate that indicates an amount of deflection of said deflection plate and an amount of compression of said spring washers which is proportional to said desired clamping force, since said spring washers compress proportionally in response to forces in said range of forces that include said desired clamping force;
   a clamping plate mounted on said base that provides a surface for mounting said work piece to said base;
   a shaft secured to said base between said deflection plate and said clamping plate that extends transversely from said base;
   a fulcrum disposed on said shaft, said fulcrum being adjustable on said shaft;
   a clamping lever having a clamping portion and a deflection portion, said clamping lever constructed to have an opening between said clamping portion and said deflection portion, said clamping lever disposed so that said shaft extends through said opening in said clamping lever and said fulcrum engages said clamping lever, said deflection portion aligned with said deflection plate and said clamping portion aligned with said work piece so that adjustment of said fulcrum on said shaft towards said base creates a tightening force on said clamping lever, which creates said desired clamping force on said clamping portion that immovably clamps said work piece to said clamping plate and simultaneously generates a deflection force, that is proportional to said desired clamping force, said deflection force being in said range of forces that causes said deflection plate and said deflection piston to deflect by compressing said spring washers proportionally to said deflection force, so that said deflection gauge indicates said desired clamping force.

2. The clamp of claim 1 further comprising:
a spring disposed around said shaft that engages said base and said clamping lever, said spring having a force that is capable of supporting said clamping lever above said base and allow said clamping lever to be rotated on said shaft so that said work piece can be easily placed in said clamp.

3. The clamp of claim 2 further comprising:
a nut that is threaded onto said shaft that is rotated to create said tightening force on said clamping lever.

* * * * *